United States Patent
Kaminski et al.

(10) Patent No.: US 9,773,331 B2
(45) Date of Patent: Sep. 26, 2017

(54) METHODS AND SYSTEMS FOR EFFICIENT GRAPHICS RENDERING

(71) Applicant: DISNEY ENTERPRISES, INC., Burbank, CA (US)

(72) Inventors: Edward Kaminski, Escondido, CA (US); Gary Frattarola, San Diego, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 490 days.

(21) Appl. No.: 14/340,977

(22) Filed: Jul. 25, 2014

(65) Prior Publication Data

US 2015/0054833 A1    Feb. 26, 2015

Related U.S. Application Data

(63) Continuation-in-part of application No. 13/975,001, filed on Aug. 23, 2013, now Pat. No. 9,633,459.

(51) Int. Cl.
*G06T 11/40* (2006.01)
*G06T 15/20* (2011.01)

(52) U.S. Cl.
CPC .......... *G06T 11/40* (2013.01); *G06T 15/205* (2013.01); *G06T 2210/12* (2013.01)

(58) Field of Classification Search
CPC ............ H04N 21/4728; G06K 9/4604; G06K 9/3233; G06K 9/46; G06T 2207/20132; G06T 7/2033; G06T 17/20; G06T 17/205; G06T 9/00; G06T 2200/08; G06T 15/30; G06F 17/30247; A61B 6/469

See application file for complete search history.

(56) References Cited

U.S. PATENT DOCUMENTS

| | | |
|---|---|---|
| 5,295,235 A | 3/1994 | Newman |
| 5,319,744 A | 6/1994 | Kelly et al. |
| 5,335,290 A | 8/1994 | Cullen et al. |
| 6,047,088 A | 4/2000 | van Beek et al. |
| 6,529,628 B1 * | 3/2003 | Baccar ................. G06K 9/4638 382/149 |
| 6,587,104 B1 | 7/2003 | Hoppe |
| 7,324,706 B2 | 1/2008 | Bassi |
| 8,243,070 B1 * | 8/2012 | Brown .................... G06T 17/20 345/423 |

(Continued)

OTHER PUBLICATIONS

Smith, Mesh Optimization Via Face Merging, posted on http://www.flipcode.com on Apr. 8, 1999, downloaded on Mar. 14, 2017 from http://www.flipcode.com/archives/Mesh_Optimization_Via_Face_Merging.shtml, 6 pages.*

(Continued)

*Primary Examiner* — Haixia Du
(74) *Attorney, Agent, or Firm* — Dorsey & Whitney LLP

(57) ABSTRACT

Methods and systems are disclosed for generating a polygon mesh that may have concavities and/or holes. One example of such a method includes generating a polygon grid, adjusting the grid to fit input image dimensions, adjusting the polygons within the grid to fit detected pixels of interest, simplifying the resulting polygon collection to reduce the total number of polygons, and generating a polygon mesh based on the simplified collection of polygons.

20 Claims, 21 Drawing Sheets

(56) References Cited

U.S. PATENT DOCUMENTS

| | | | |
|---|---|---|---|
| 2002/0130867 A1* | 9/2002 | Yang | G06T 17/20 |
| | | | 345/428 |
| 2004/0227750 A1 | 11/2004 | Su et al. | |
| 2006/0127880 A1* | 6/2006 | Harris | G06K 9/00127 |
| | | | 435/4 |
| 2006/0256125 A1* | 11/2006 | Neal | G09G 5/006 |
| | | | 345/589 |
| 2007/0165948 A1 | 7/2007 | Laffargue et al. | |
| 2008/0118148 A1* | 5/2008 | Jiao | G06T 15/30 |
| | | | 382/173 |
| 2009/0115718 A1* | 5/2009 | Qiao | G09G 3/3426 |
| | | | 345/102 |
| 2010/0214294 A1 | 8/2010 | Li et al. | |
| 2011/0002394 A1 | 1/2011 | Gandolph et al. | |
| 2011/0229033 A1 | 9/2011 | Muquit | |
| 2013/0293544 A1 | 11/2013 | Schreyer et al. | |
| 2015/0149875 A1* | 5/2015 | Masuko | G06T 11/60 |
| | | | 715/202 |

OTHER PUBLICATIONS

Imagination Technologies LTD., "Power VR—A Master Class in Graphics Technology and Optimization", Imagination Technologies Ltd. presentation slides for Master Class in Graphics Technology and Optimization, Jan. 14, 2012, 50 pages, found at: http://www.imgtec.com/powervr/insider/powervr_presentations/GDC%20HardwareAndOptimisation.pdf.

* cited by examiner

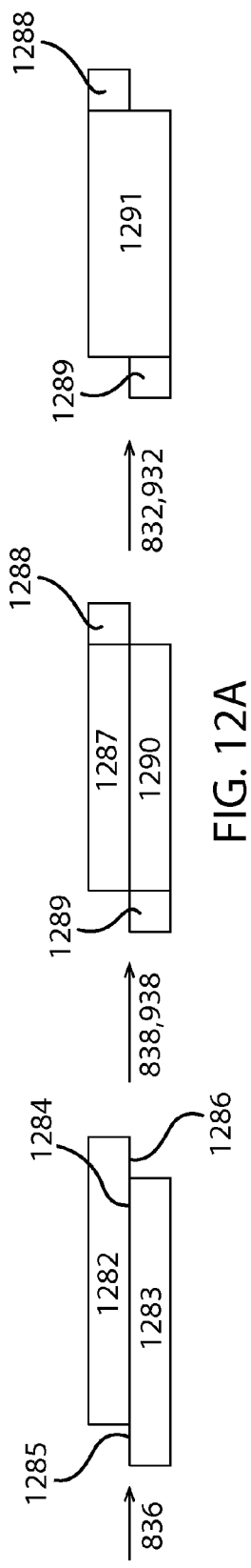
FIG. 12A
FIG. 12B
FIG. 12C

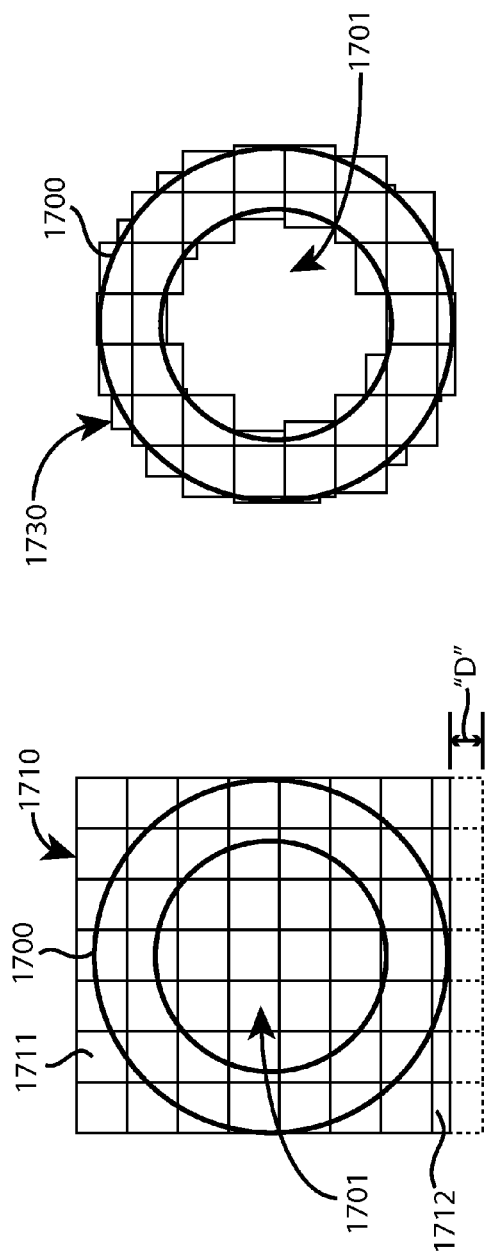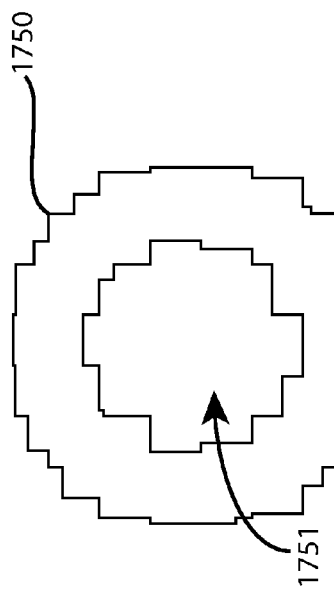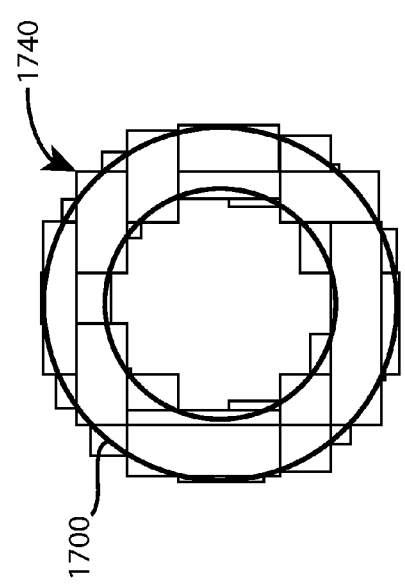

METHODS AND SYSTEMS FOR EFFICIENT GRAPHICS RENDERING

CROSS REFERENCE TO RELATED APPLICATIONS

This application is a continuation in part of U.S. patent application Ser. No. 13/975,001 filed 23 Aug. 2013 entitled "METHODS AND SYSTEMS FOR CREATING A HULL THAT MAY HAVE CONCAVITIES," which is hereby incorporated herein by reference in its entirety.

BACKGROUND OF THE INVENTION

In computer graphics, a quad may be used to render a two dimensional sprite (e.g., a two dimensional image or animation) onto a background. The quad is typically defined such that it includes all of the pixels of the sprite. Such quads, however, can include a large number of pixels that are rendered transparently onto the background and thus do not add any further defining characteristics to the sprite, such as color. Rendering these transparent pixels typically will not affect the displayed image, the rendering hardware is generally required to nonetheless processes these pixels, consuming resources that could otherwise be available for rendering other pixels. For example, rendering these transparent pixels may waste a portion of the finite fill rate typically available in rendering hardware. In instances where the image has an alpha channel the effect of the rendering of these transparent pixels is further exacerbated because read-modify-write logic may be required for every pixel within the quad.

To reduce the number of pixels that do not need to be rendered, and to thereby free up a portion of the finite fill rate, a convex hull may be created that convexly encapsulates the pixels of the sprite. For example, the contours of the convex hull may be used to define the boundaries of pixels to be rendered, which may encompass fewer transparent pixels than a simple quad. However, even using this type of technique, transparent pixels may be unnecessarily rendered, such as transparent pixels encompassed within the hull, such as holes, openings, and/or other non-colored portions of the image.

BRIEF DESCRIPTION OF THE DRAWINGS

FIGS. 12A through 12C illustrate rectangles that may be divided and combined during the process of generating a polygon mesh.

FIGS. 17A-17D illustrate another example of the polygon mesh forming method according to FIG. 14.

DETAILED DESCRIPTION

The present disclosure is directed to rendering two-dimensional (2D) and/or three-dimensional (3D) images using a collection of polygons to approximate an input image area. In particular, the methods described herein may be used to creating polygon meshes for rendering images, such as texture or depth maps, onto a 2D and/or 3D object while reducing the amount of processing resources. In some embodiments the system and method described herein may be used to render sprites into a virtual scene such as an animated image, e.g., video game images, animated content, or the like.

In some embodiments, the method creates one or more hulls and polygon meshes that closely match the input image and reduces rendering of superfluous or undesired pixels, such as transparent pixels. As on example, in instances where the meshes may contain concavities, convexities, and holes, the superfluous pixels may be discarded or otherwise not rendered by the processor, which increases the processing speed for the graphic(s). Additionally, in some instances, a polygon reduction algorithm may be used to can reduce the total number of polygons of the polygon mesh, while still helping to ensure that the mesh fully covers the input image. In some specific examples the input image may be texture map that is overlaid or applied to an object such as a character or item within the scene, but in other embodiments other types of graphical elements may be used and as such it should be understood that the input image may be substantially any format compatible with the intended use.

An example of such a polygon reduction algorithm referred to above may be one of the methods described in U.S. patent application Ser. No. 13/974,882, entitled "Methods and Systems for Generating A Polygon Mesh," filed on Aug. 23, 2013, the entirety of which is hereby incorporated by reference for all purposes.

Figure 1:
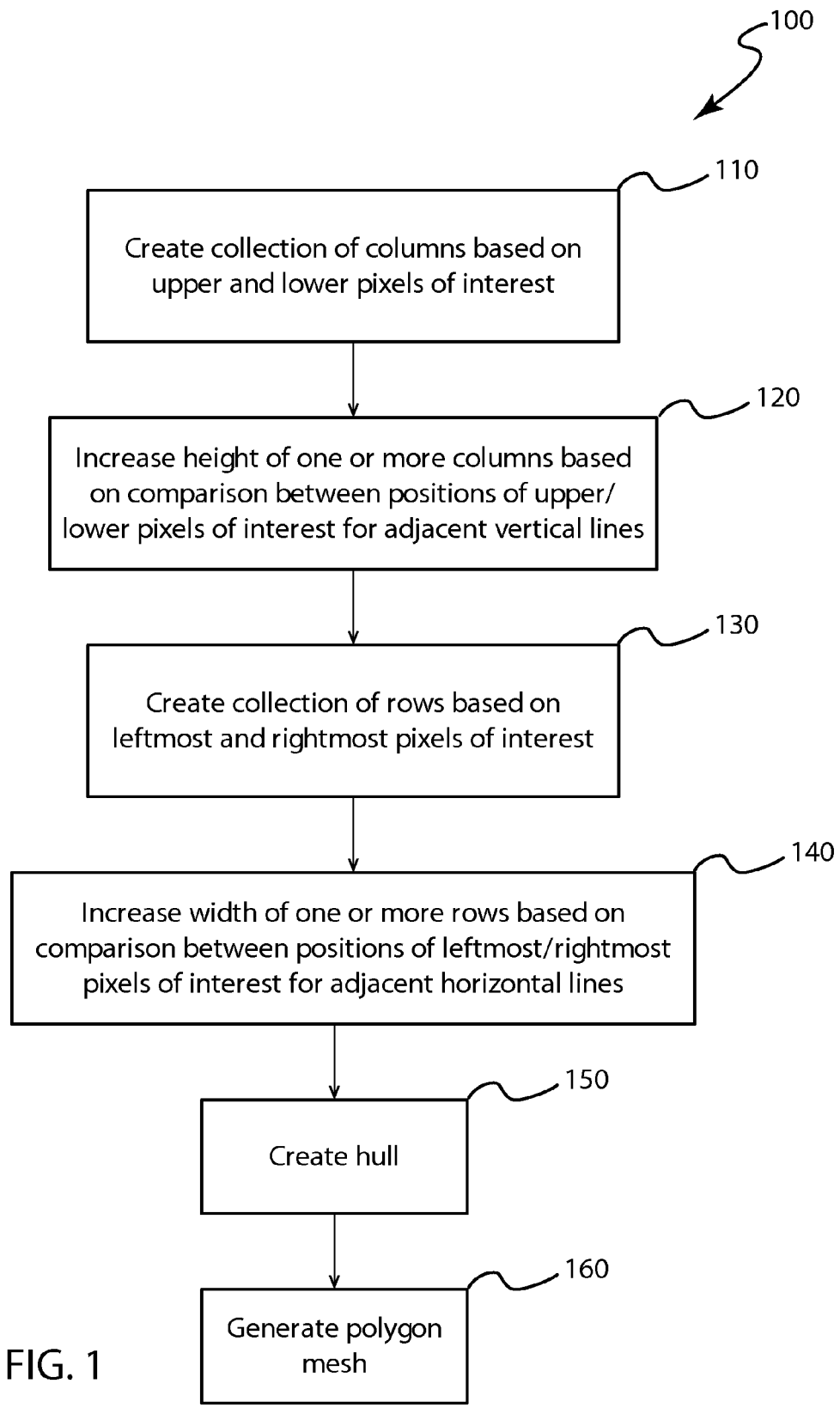
FIG. 1 is a flowchart for one embodiment of a method for creating a hull that may have concavities.
Figure 7:
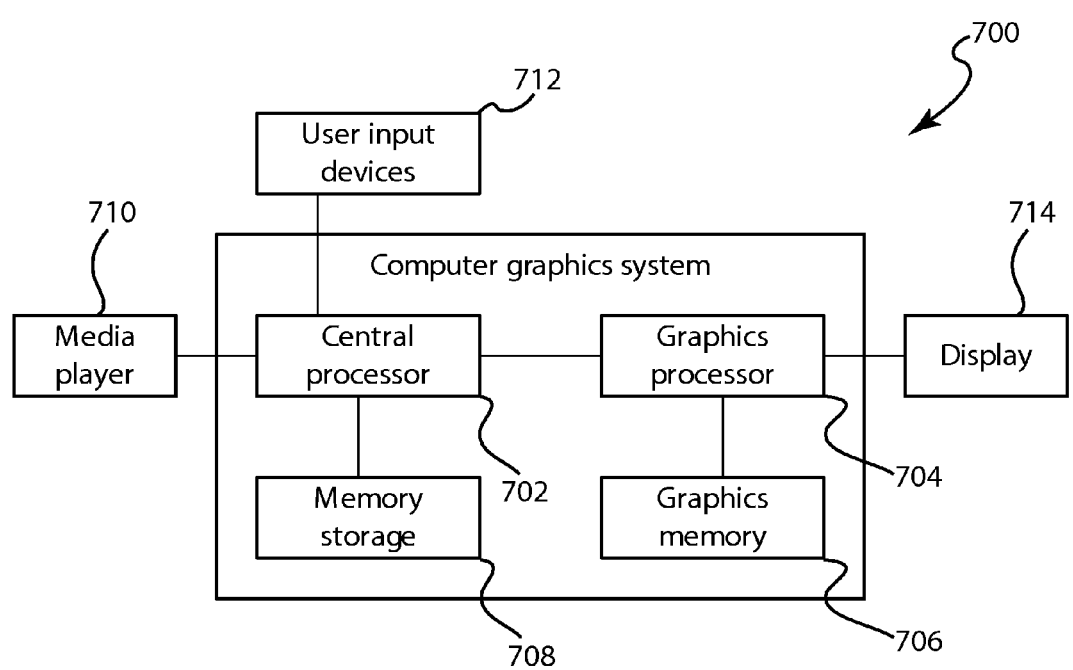
FIG. 7 is a block diagram of a computer graphics system for creating a hull that may have concavities.

Turning to the figures, a technique for increasing rendering efficiency for graphical objects will now be discussed in more detail. FIG. 1 illustrates a method 100 that may be used to create a hull that may have concavities and also to generate a polygon mesh corresponding to the hull for use in rendering an image on a display. The method 100 may be performed by a computer graphics system, such as that shown in FIG. 7 and described below.

Method 100 may begin with operation 110, in which a collection of columns is created based on an upper pixel of interest and a lower pixel of interest for each of a plurality of vertical lines of an image. The image may be a raster image, a texture map, or generally any type of image. The collection of columns may represent a first hull, which may be convex on the left and right sides, and depending on the image from which it is derived may be concave on the top and/or bottom sides. The pixels of interest may be visible (e.g., translucent or opaque) pixels in some embodiments. In other embodiments, the pixels of interest may be determined using chroma keying—for example, a specific color or range of colors may be designated as not being of interest in order to isolate a portion of an image from a background corresponding to the designated color or color range. In some embodiments, the upper and lower pixels of interest may be the uppermost and lowermost pixels of interest for the entire image (e.g., global upper and lower pixels of interest). In other embodiments, however, the upper and lower pixels of interest may be localized. If the upper and lower pixels of interest are localized, a plurality of collections of columns may be obtained (each collection of columns representing a separate hull) and/or one or more of the columns may include a plurality of run lengths.

Figure 3B:
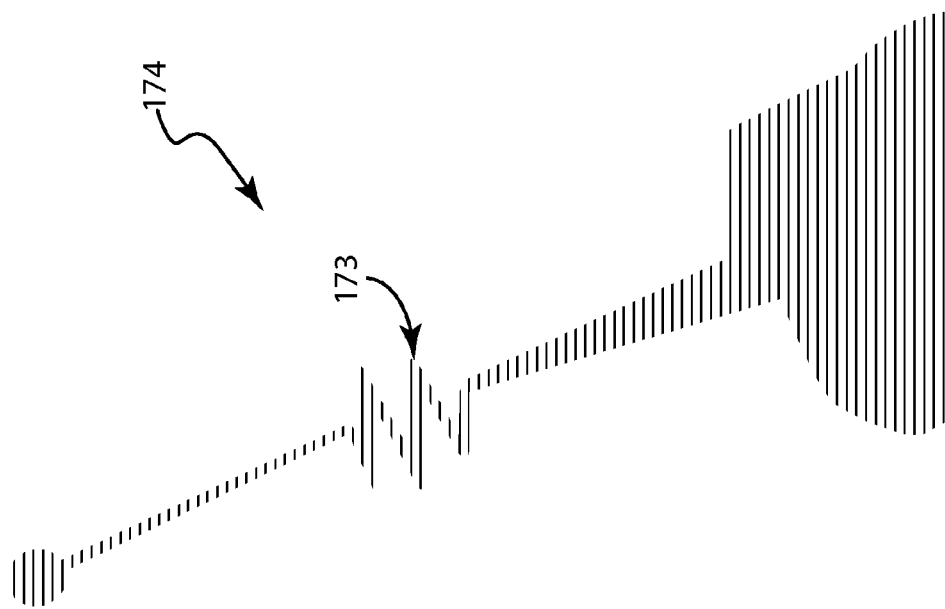
FIG. 3B illustrates a collection of rows derived from an image and that form a second hull.
Figure 3A:
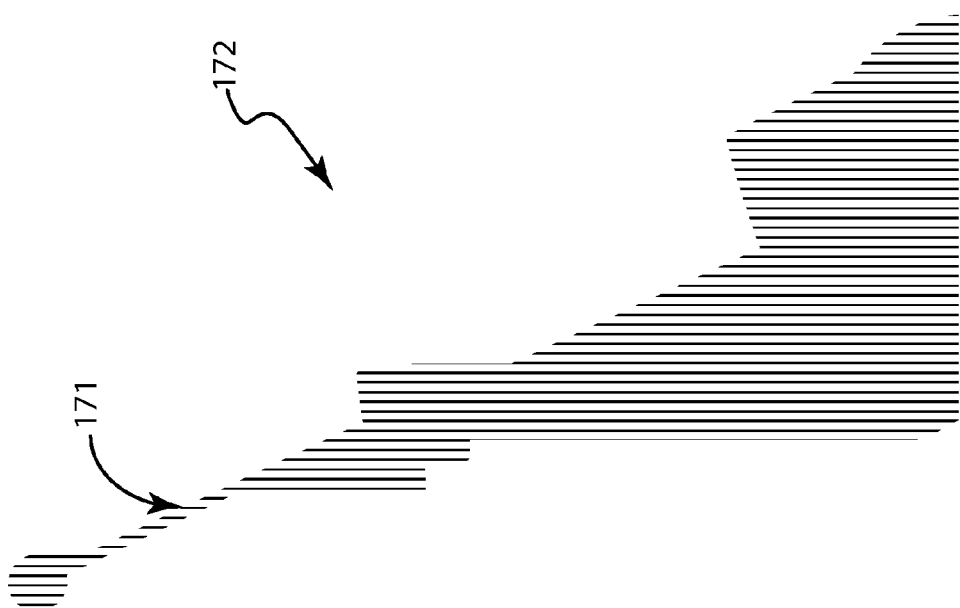
FIG. 3A illustrates a collection of columns derived from an image and that form a first hull.

To illustrate operation 110, FIG. 3A shows a plurality of columns 171 that have been created by scanning through the columns of an image from left to right, identifying the uppermost pixel of interest and lowermost pixel of interest in each column. The plurality of columns 171 define the first hull 172, which includes concavities on both its top and bottom sides.

In operation 120, the first hull may be grown by increasing a height of one or more columns in the collection of columns based on a comparison between positions of the upper and/or lower pixels of interest for two or more adjacent vertical lines of the image. Many such comparisons may be done—moving from left to right, and/or from right to left—until the entire image has been scanned. In other embodiments, however, only local areas of an image may be scanned.

Figure 4A:
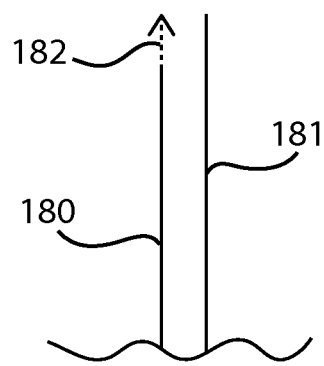
FIGS. 4A through 4D illustrate methods to grow columns and rows in a hull.
Figure 4B:
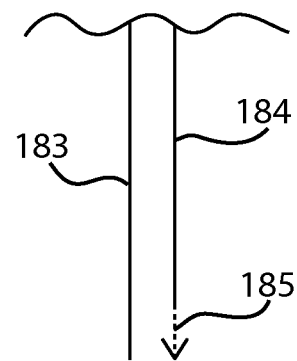

In some embodiments of operation 120, the height of the one or more columns in the collection of columns may be increased based on the positions of the upper and/or lower pixels of interest for two or more adjacent vertical lines of the image being within an error tolerance of each other. Specifically, with reference to columns 180 and 181 illustrated in FIG. 4A, the height of column 180 may be increased upward (as indicated by dotted arrow 182) so that it its top extends to and terminates at the same position as the top of the adjacent column 181. Similarly, with reference to columns 183 and 184 illustrated in FIG. 4B, the height of column 184 may be increased downward (as indicated by dotted arrow 185) so that its bottom extends to and terminates at the same position as the bottom of the adjacent column 183.

The error tolerance used in increasing the height of the columns in operation 120 (and also for increasing the width of the rows in operation 140, as described below) may be determined based on a target number of polygons to be included in a polygon mesh corresponding to the third hull created in operation 150 in some embodiments. In some cases, hardware characteristics of a target device may be known—for example, investigation of a particular electronic device may lead to the conclusion that rendering a certain number of polygons is best for the performance of that device. Furthermore, the error tolerance and/or the target number of polygons may be determined by analyzing the time and performance needed to render additional pixels versus the time and performance needed to render additional polygons. In other words, while generally it is better to render fewer pixels, if doing so requires a large number of polygons, then any performance gained by not rendering some pixels may be lost by the need to render the additional polygons. Similarly, while it is generally better to render fewer polygons, if doing so requires a large number of pixels to be unnecessarily rendered, then any performance gained by rendering fewer polygons may be lost by the need to render additional pixels. Also, in hardware that implements tile based deferred rendering, or another tiled rendering scheme, the performance cost of clipping against each tile may need to be taken into account when deciding an ideal number of polygons to be rendered.

In operation 130, a collection of rows is created based on a leftmost pixel of interest and a rightmost pixel of interest for each of a plurality of horizontal lines of the image. The collection of rows may represent a second hull, which may be convex on the top and bottom sides, and may be concave on the left and/or right sides—again depending on the image from which it is derived. In some embodiments, the leftmost and rightmost pixels of interest may be the leftmost and rightmost pixels of interest for the entire image (e.g., global leftmost and rightmost pixels of interest). In other embodiments, however, the leftmost and rightmost pixels of interest may be localized. If the leftmost and rightmost pixels of interest are localized, a plurality of collections of rows may be obtained (each collection of rows representing a separate hull) and/or one or more of the rows may include a plurality of run lengths.

To illustrate operation 130, FIG. 3B shows a plurality of rows 173 that have been created by scanning through the rows of an image from top to bottom, identifying the leftmost pixel of interest and rightmost pixel of interest in each row. The plurality of rows 173 define the second hull 174, which includes concavities on both its left and right sides.

In operation 140, the second hull may be grown by increasing the width of one or more rows in the collection of rows based on a comparison between positions of the leftmost and/or rightmost pixels of interest for two or more adjacent horizontal lines of the image. In some embodiments, the width of the one or more rows in the collection of rows may be increased based on the positions of the leftmost and/or rightmost pixels of interest for two or more adjacent horizontal lines of the image being within an error tolerance of each other—which may be determined based on known hardware characteristics, as mentioned above.

Figure 4C:
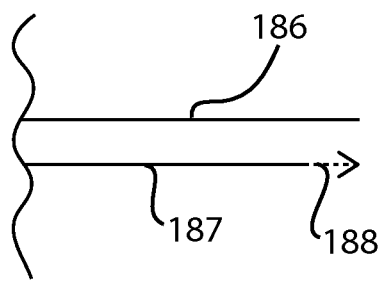
Figure 4D:
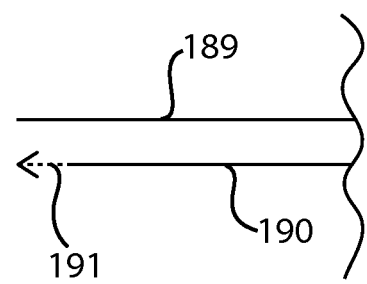

Referring to the examples illustrated in FIG. 4C, with reference to rows 186 and 187, the width of row 187 may be increased towards the right (as indicated by dotted arrow 188) so that its right end extends to and terminates at the same position as the right end of the adjacent row 186. Similarly, as illustrated in FIG. 4D, the width of row 190 may be increased towards the left (as indicated by dotted arrow 191) so that its left end extends to and terminates at the same position as the left end of the adjacent row 189.

In operation 150, a third hull may be created by combining the first and second hulls. In some embodiments, the third hull may be created by generating a collection of scan line run lengths corresponding to pixels present in both the first and second hulls—in other words, the third hull may be defined to include pixels represented in both the collection of columns from operation 110 and the collection of rows from operation 130. The third hull may be considered as the result of a logical AND of the first and second hulls.

The third hull created in operation 150 may include one or more concavities on one or more sides, depending on the image from which it is derived. In some examples, again depending on the original image, the third hull may have concavities on 1, 2, 3, or even 4 sides. In general, the third hull created in operation 150 may include concavities from both the first and second hulls created in operations 110 and 130. Because the third hull can include such concavities, rendering only the pixels within the hull may reduce the number of pixels rendered as compared to a quad-type rendering system.

Figure 5:
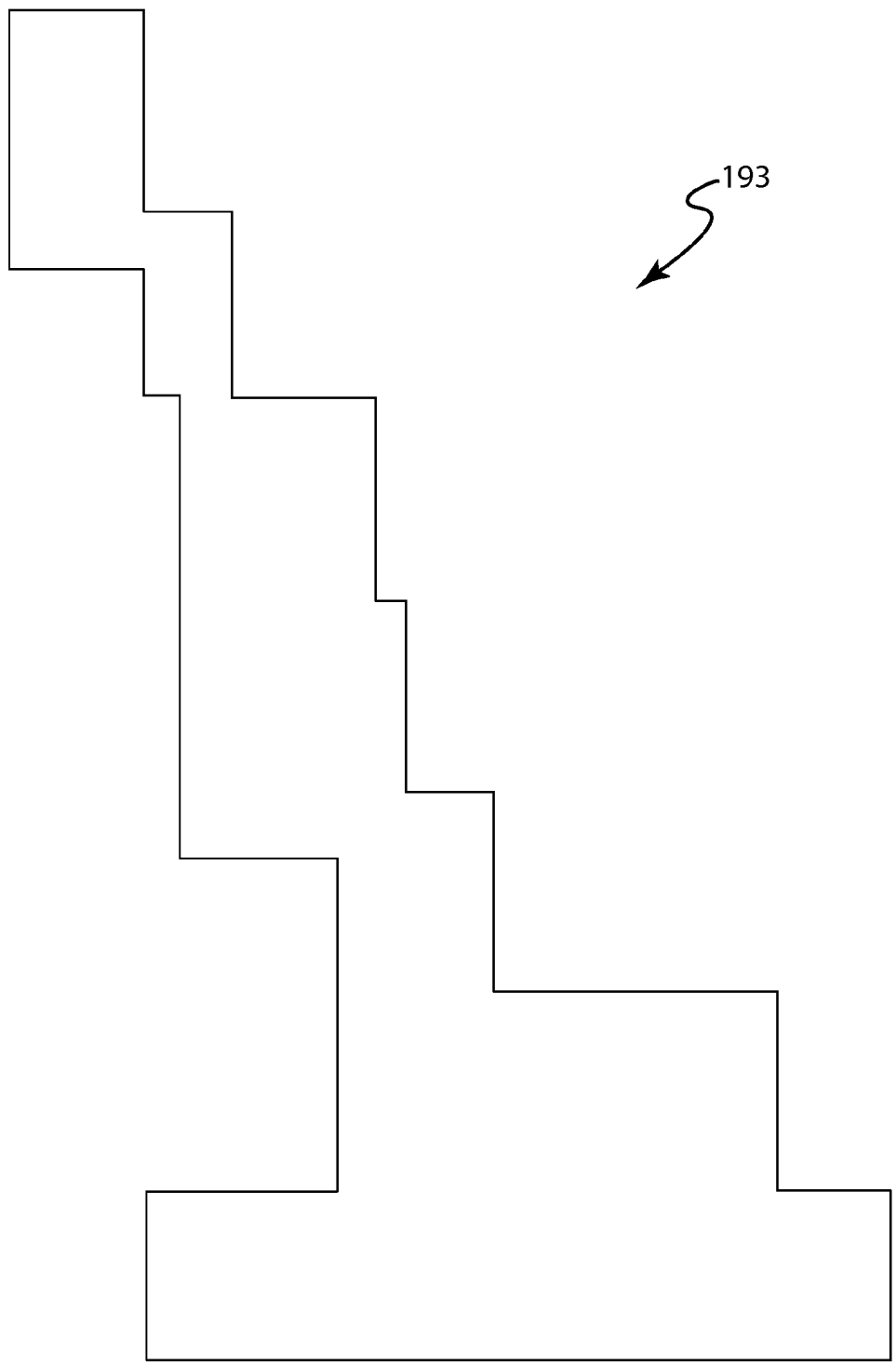
FIG. 5 illustrates a hull that may be created using one of the methods from FIG. 1, 1A, or 2.

FIG. 5 illustrates one example of a third hull 193 that may be created in operation 150 by combining the first and second hulls from operations 110 and 130. As illustrated in FIG. 5, the third hull 193 includes many concavities, and is fairly compact around the image of interest, but not on a pixel-accurate level.

In operation 160, a polygon mesh may be generated that corresponds to the third hull. The polygon mesh may be generated in many different manners. The polygon mesh may be created, for example, by one of the methods described in U.S. patent application Ser. No. 13/974,882, entitled "Methods and Systems for Generating A Polygon Mesh," filed on Aug. 23, 2013, the entirety of which is hereby incorporated by reference for all purposes. These methods are also shown in FIGS. 8 through 13 and described below, and an alternative embodiment of the method is shown in FIGS. 14 through 17 and described below. In one example, and with reference to FIG. 9 below, a collection of scan line run lengths may be created, which may correspond to the third hull from operation 150. A collection of rectangles may be created by associating each respective scan line run length with a respective rectangle. That collection of rectangles may be modified by dividing one or more rectangles in the collection of rectangles into a plurality of rectangles, and by combining two or more adjacent rectangles in the collection of rectangles that have similar widths and/or heights. More generally, any of the methods and variations described below with reference to FIGS. 8 to 13 may be used to generate the polygon mesh in operation 160.

Figure 6:
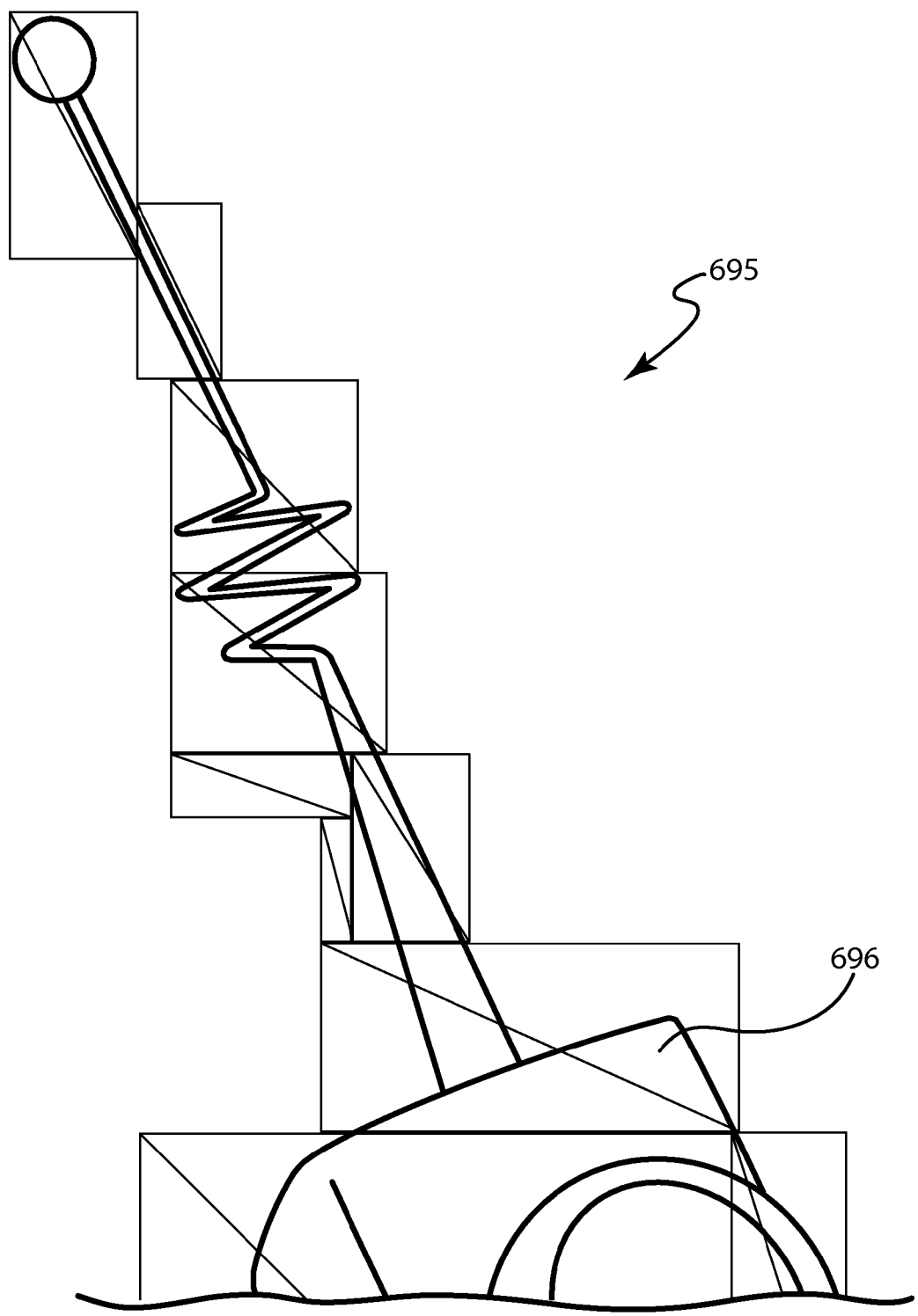
FIG. 6 illustrates one example of a polygon mesh corresponding to the hull from FIG. 5 overlaid on an image.

FIG. 6 illustrates one example of a polygon mesh 695 (overlaid on image 696) that is generated from the hull 193 of FIG. 5. As can be seen by comparing FIG. 6 with the polygon mesh 1392 in FIG. 13, the polygon mesh 695 in FIG. 6 includes far fewer polygons, but only slightly more transparent pixels. As mentioned above, the polygon mesh 695 in FIG. 6 may represent the best trade-off for some rendering hardware between rendering unnecessary pixels and rendering too many polygons.

Figure 1A:
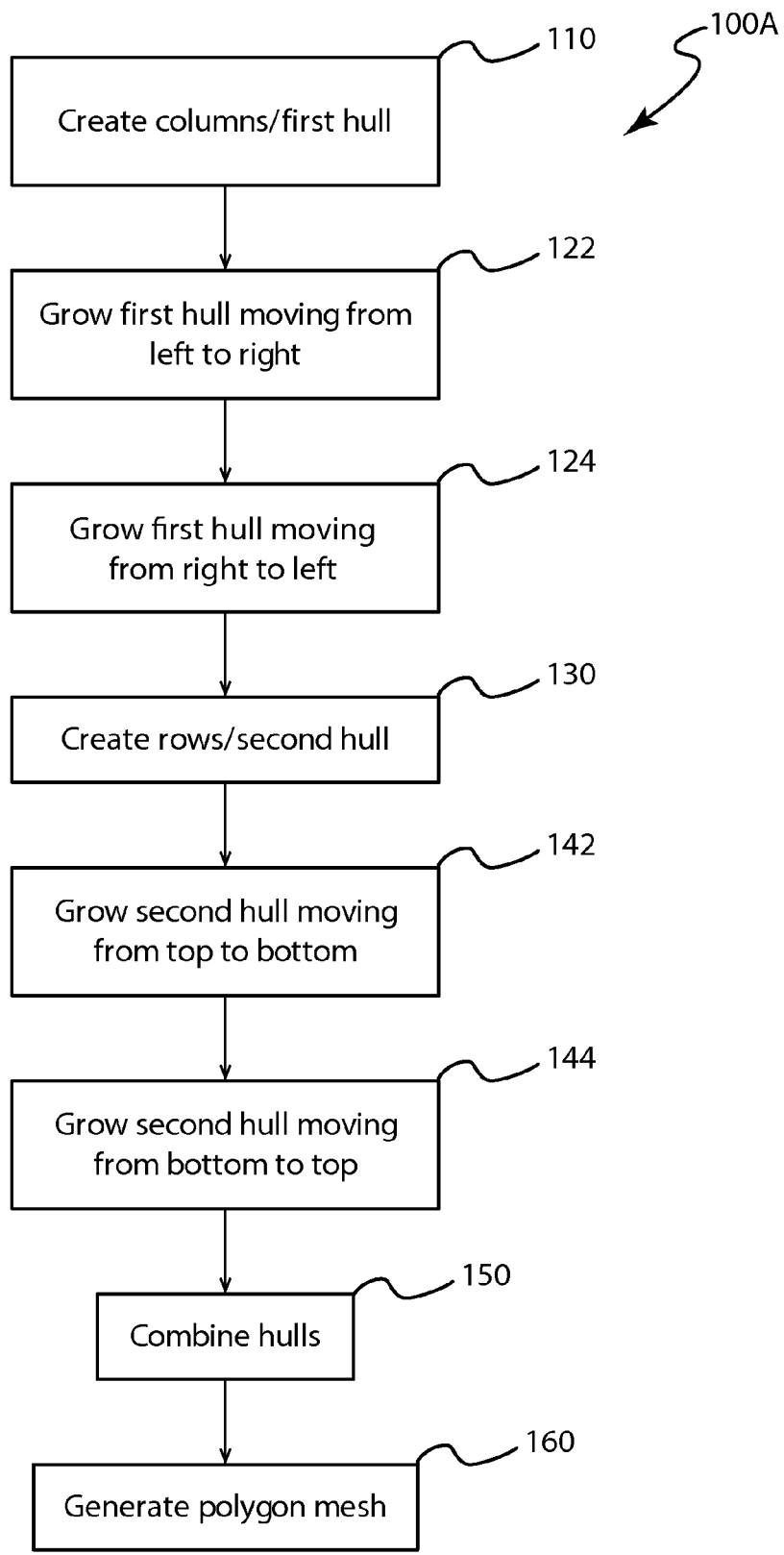
FIG. 1A is a flowchart for one embodiment of a method for creating a hull that may have concavities.

With reference now to the method 100A illustrated in FIG. 1A, which is a variation on the method 100 illustrated in FIG. 1, the method 100A may begin with operation 110, in which a collection of columns is created representing a first hull. In operation 122, the first hull is grown by increasing the height of one or more columns moving from left to right—e.g., the leftmost column is compared to its adjacent column, moving through the image all the way until the next to rightmost column is compared to the rightmost column. Similarly, in operation 124, the first hull is grown by increasing one or more columns moving from right to left. Moving through the columns of the second hull both from left to right and from right to left may cause the growing of the first hull to be more symmetrical than only moving through in a single horizontal direction.

In operation 130, a collection of rows is created representing a second hull. In operation 142, the second hull is grown by increasing the width of one or more rows moving from top to bottom—e.g., the uppermost row is compared to its adjacent row, moving through the image all the way until the next to lowermost row is compared to the lowermost row. Similarly, in operation 144, the second hull is grown by increasing one or more columns moving from bottom to top. As above, moving through the rows of the second hull both from top to bottom and from bottom to top may cause the growing of the second hull to be more symmetrical than only moving through in a single vertical direction.

In operation 150, the first and second hulls are combined, and in operation 160 a polygon mesh is generated that corresponds to the boundaries of the combined, third hull. As illustrated by the operations in method 100A shown in FIG. 1A, in some embodiments, the hull may be grown (e.g., the columns and/or rows may be extended) before the hulls are combined in operation 150. In other embodiments, however, the hulls from operations 110 and 130 may be combined in operation 150 before the growing operations 122, 124, 142, 144 are performed.

Figure 2:
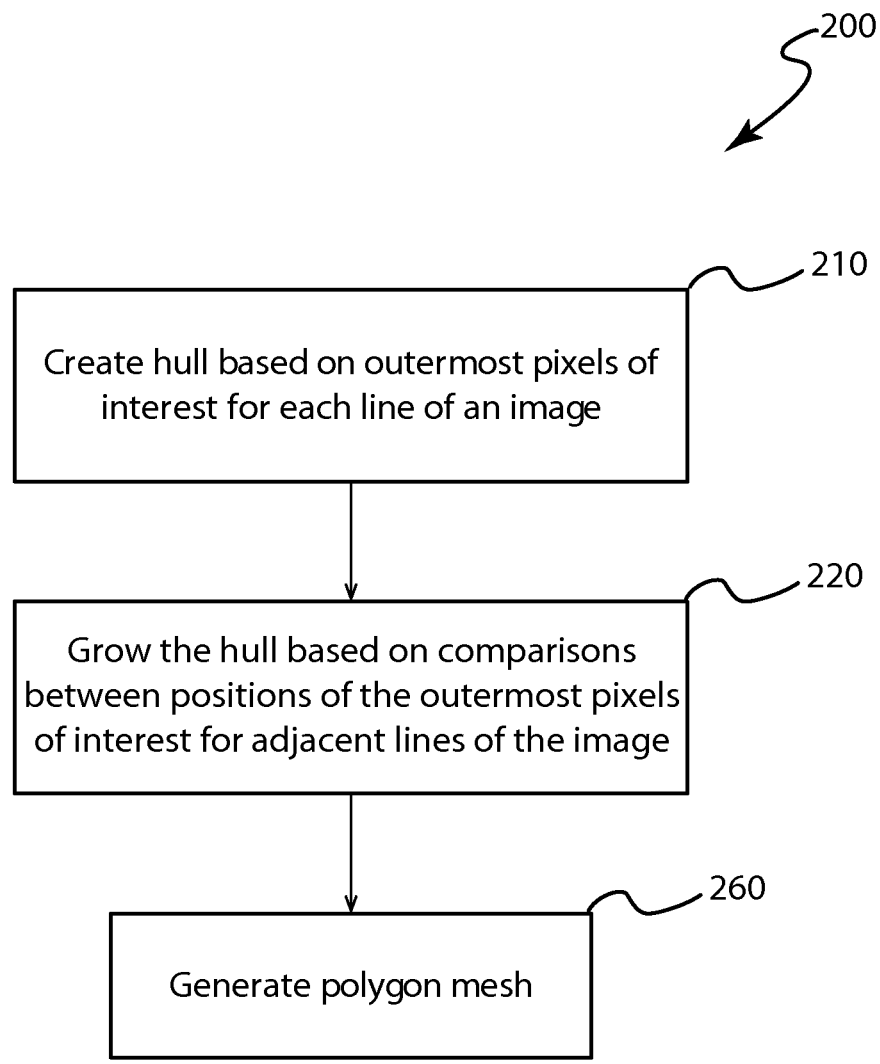
FIG. 2 is a flowchart for one embodiment of a method for creating a hull that may have concavities.

Turning now to FIG. 2, another embodiment of a method 200 is illustrated that may be used to create a hull that may have concavities and to generate a polygon mesh corresponding to that hull for use in rendering an image on a display. The method 200 may be performed by a computer graphics system, such as that shown in FIG. 7 and described below, and may be in some respects similar to methods 100, 100A shown in FIGS. 1 and 1A and described above.

Method 200 may begin with operation 210, in which a hull is created based on outermost pixels of interest for each of a plurality of lines of an image. In some embodiments, pixels from a localized region of the image may be the pixels of interest. In other words, rather than scanning for the leftmost, rightmost, uppermost, and bottommost pixels of interest for an entire image, localized regions may be scanned, thereby effectively creating a plurality of smaller hulls, or a hull with more complex concavities, for the image.

In some embodiments of operation 210, the outermost pixels of interest may be determined by including only visible pixels of the image in the hull. Also, in some embodiments the hull may be created by looking at the outermost pixels of interest in a horizontal direction (e.g., in a plurality of horizontal lines), by looking at outermost pixels of interest in a vertical direction (e.g., in a plurality of vertical lines), or by looking at outermost pixels of interest in both horizontal and vertical directions.

In operation 220, the hull is grown based on comparisons between positions of the outermost pixels of interest for two or more adjacent lines of the image, and in operation 260, a polygon mesh may be created to fill the hull, which polygon mesh may subsequently be used, for example, to render a sprite on a display. The polygon mesh in operation 260 may in some embodiments be created by following the methods 800, 900 illustrated in FIGS. 8 and 9 and described below.

A simplified computer graphics system 700 that may be configured to carry out the methods 100, 100A, 200 and operations described above is illustrated in FIG. 7. Generally, the computer graphics system 700 includes at least one central processor 702 and one or more graphics processors 704. In some embodiments, the at least one central processor 702 and the one or more graphics processors 704 include at least one multicore processor, such as a dual core or quad core processor, for example. In some embodiments, a plurality of processors may be configured to operate in parallel.

Additionally, in some embodiments, the central processor 702 and the graphic processor 704 may be part of the same group of processing cores.

The computer graphics system 700 includes a graphics memory 706 coupled directly to the graphics processor 704. The graphics memory 706 functions as execution memory and may have a relatively large memory capacity. Execution memory may include various forms of random access memory (RAM), such as dynamic RAM, static RAM, and the like. In addition to the dedicated graphics memory 706, memory/storage 708 is coupled to the central processor 702. In some embodiments, external storage may be provided and communicatively coupled to the computer graphics system. Large amounts of information and data accessible by the processor 702 may be stored on the storage device. The storage device may be a hard disk drive, a solid-state drive, or the like.

Additionally, one or more types of media players/recorders 710 are coupled to the computer graphics system 700, such as DVD drives, compact disc drives, and so forth. In some embodiments, the one or more media players may be integrated within the system 700. Image data used to generate the meshes described above may be stored on one or more types of media using the media player/recorders 710 for playback in other devices and in other environments.

User input may be provided to the system 700 via user input devices 712. The user input devices 712 may include a keyboard, a mouse, a track ball, a stylus, a camera, and so forth. The user input devices 712 allow a user to control the system 700 and provide input to the system to manipulate data to achieve a desired result.

Further, the computer graphics system 700 includes a display 714 coupled to the graphics processor 704, such as a plasma, LCD, CRT, etc., display to graphically display images and allow for interaction with a user. As such, the computer graphics system is suited to create a hull that may have concavities and to generate polygon meshes corresponding to such a hull, as well as to render one or more images (e.g., one or more sprites) on the display 714 using the generated polygon meshes. In one embodiment, the computer graphics system 700 may implement tile based deferred rendering (TBDR), in which case the image may be rendered to a plurality of tiles on the display 714.

Figure 8:
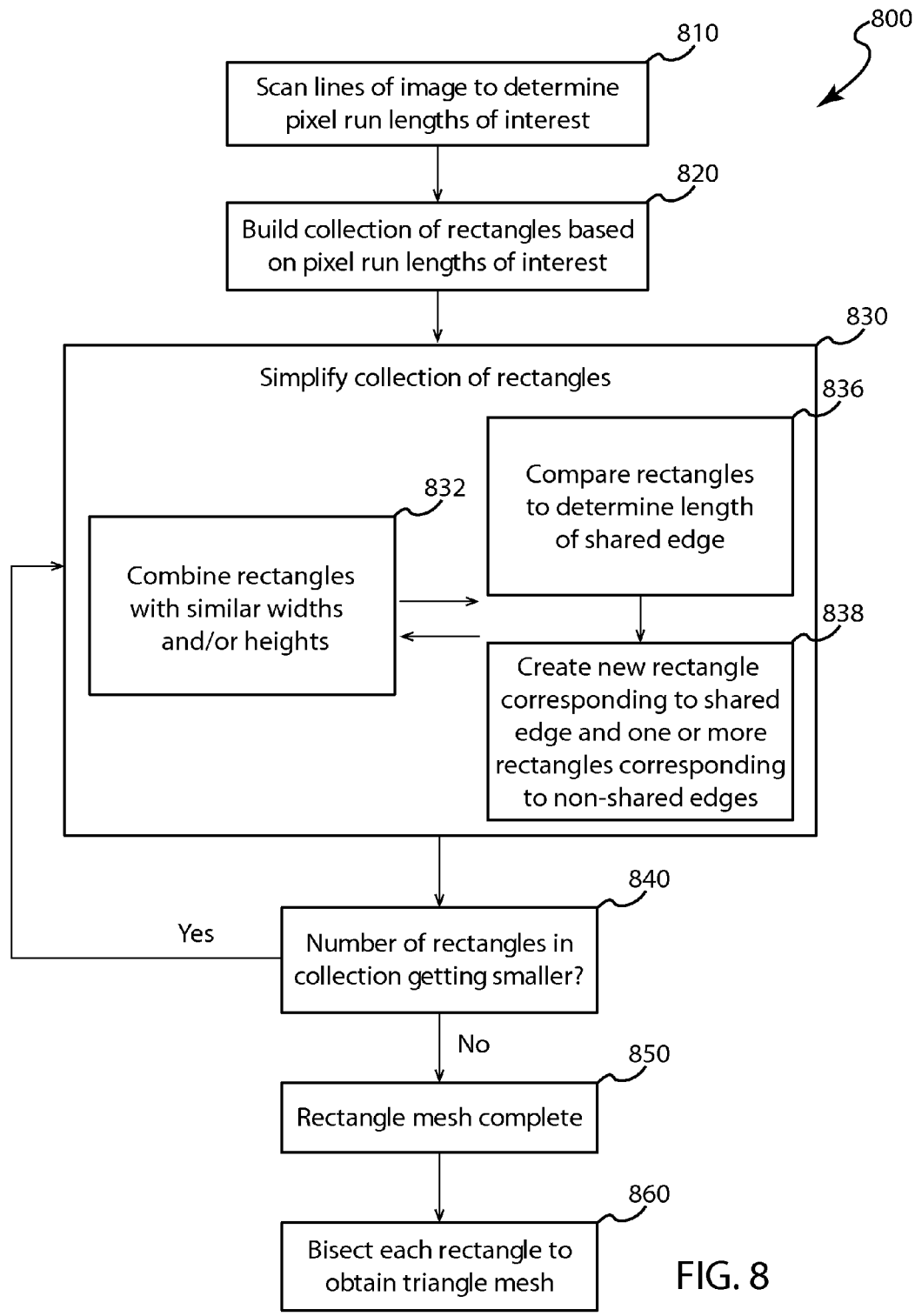
FIG. 8 is a flowchart for one embodiment of a method for generating a polygon mesh.

FIG. 8 illustrates a method 800 that may be used to generate a polygon mesh for use in rendering an image on a display. The method 800 may be performed by a computer graphics system, such as that shown in FIG. 7.

Method 800 may begin with operation 810, in which each of a plurality of lines of an image is scanned to determine one or more pixel run lengths of interest. The image may be a raster image, a texture map, or generally any type of image. Each line of the image may include no pixel run lengths of interest, one pixel run length of interest, or a plurality of pixel run lengths of interest.

The pixel run lengths of interest may be determined in some embodiments by inspecting alpha values for pixels in each of the plurality of lines. If, for example, the pixels of interest are translucent pixels, the pixel run lengths of interest will include pixels with alpha values corresponding to translucency. If, on the other hand, the pixels of interest are opaque pixels, the pixel run lengths of interest will include pixels with alpha values corresponding to opacity. If the pixels of interest are all visible pixels, the pixel run lengths of interest will include pixels with alpha values corresponding to either translucency or opacity.

In other embodiments, however, the pixel run lengths of interest may be determined in another manner—such as by inspecting color values. If, for example, a mesh encompassing all of the white or black pixels is desired, the pixel run lengths of interest may be determined by inspecting the color values for pixels in each of the plurality of lines. In one embodiment, the pixel run lengths of interest may be determined using chroma keying—for example, a specific color or range of colors may be designated as not being of interest in order to isolate a portion of an image from a background corresponding to the designated color or color range.

Referring still to operation 810, each line of the image (e.g., each horizontal line, or alternatively each vertical line) may be scanned until a pixel of interest is encountered. For a horizontal scan line, the x-position of the first pixel of interest may be noted, and the scan continues until either the scan line ends or until a pixel is encountered that is not of interest. The position of the last pixel of interest in that run length (or alternatively, the length of the run from the first pixel of interest to the last pixel of interest) is also noted. If there are still additional pixels on the current line, scanning continues to find additional possible run lengths, until the end of the line is encountered—at which point the same process is repeated for the next line, until the entire image has been scanned.

Figure 11A:
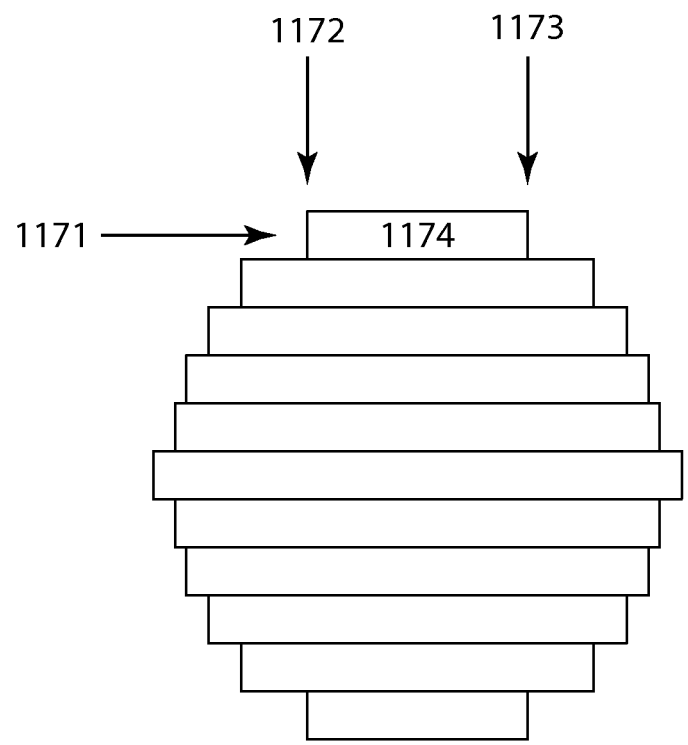
FIGS. 11A and 11B illustrate scan line run lengths that may be used during the process of generating a polygon mesh.

To illustrate operation 810, FIG. 11A shows a first horizontal line 1171 of an image. The horizontal line 1171 may be scanned until the first pixel of interest is encountered at x-position 1172. The scanning then continues until the last pixel of interest for the run length is encountered at x-location 1173. The relative positions of the two x-positions 1172, 1173 are noted, indicating a pixel run length of interest 1174, and scanning continues. Because no further pixels of interest are encountered on horizontal line 1171, scanning proceeds to the next horizontal line, and so on until all of the horizontal lines have been scanned, and the relative positions of the pixel run lengths of interest have been noted for each horizontal line.

Figure 11B:
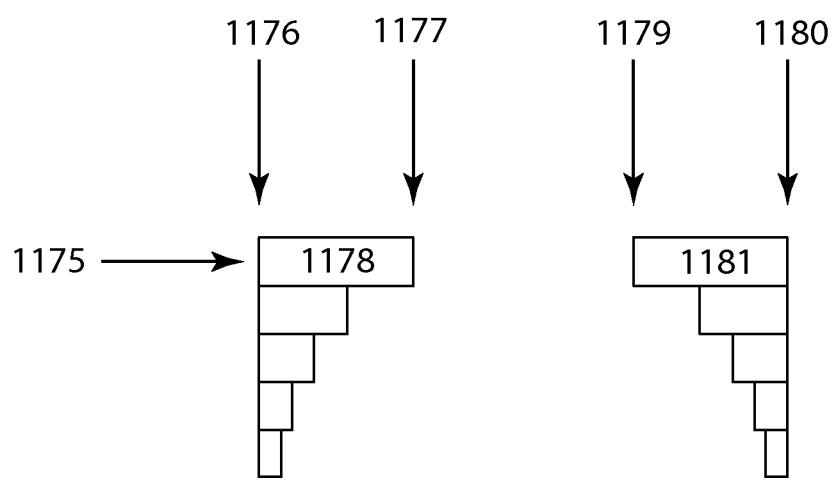

Similarly, FIG. 11B shows a first horizontal line 1175, which includes a plurality of pixel run lengths of interest. In operation 1110, horizontal line 1175 may be scanned to determine the beginning x-position 1176 and ending x-position 1177 of a first pixel run length of interest 1188, as well as the beginning x-position 1179 and ending x-position 1180 of a second pixel run length of interest 1181.

In operation 820, a collection (e.g., a list) of rectangles is built based on the one or more pixel run lengths from the plurality of lines that were determined in operation 810. Depending on which pixels were deemed of interest in operation 810, the collection of rectangles may be built by including translucent and/or opaque pixel run lengths. A collection of rectangles with both translucent and opaque pixel run lengths may encompass all of the visible pixels in the image, but no transparent pixels in the image.

The collection of rectangles may be built in operation 820 by converting each of the scan line run lengths of interest into rectangles that are one pixel in height. Referring to FIGS. 11A and 11B, for example, each pixel run length of interest 1174, 1178, 1181 may be converted into a one pixel high rectangle 1174, 1178, 1181, with the left and right sides of the rectangles 1174, 1178, 1181 defined by the respective beginning and ending x-positions of the pixel run lengths of interest and the top and bottom sides of the rectangles 1174, 1178, 1181 defined by the y position of the horizontal lines 1171, 1175, respectively, within the image.

Referring again to the method 800 illustrated in FIG. 8, in operation 830, the collection of rectangles may be simplified—for example, the collection may be simplified in that the overall number of rectangles in the collection is reduced while the overall sizes of the rectangles increases. More specifically, in operation 832, one or more rectangles may be combined with one or more other rectangles in the collection that have similar widths and/or similar heights.

In operation 836, one or more of the rectangles in the collection of rectangles may be compared with one or more of the other rectangles in the collection of rectangles (such as two adjacent rectangles) to determine whether a first length of a shared edge between the (two adjacent) rectangles is greater than a second length of one or both of the (two adjacent) rectangles that is not shared between the (two adjacent) rectangles. If the first length is greater than the second length, one or more new rectangles may be created that correspond to the shared edge, and one or more additional new rectangles may also be created that correspond to one or more non-shared edges of the two adjacent rectangles in operation 838. Depending on the first and second lengths (i.e., depending on the length of the shared and non-shared edges of the rectangles), operation 838 may result in a temporary increase in the number of rectangles in the collection—as shown in FIGS. 12A through 12C, which are described below. This increase may, however, be counteracted in a subsequent iteration of operation 832, in which rectangles with similar heights and/or widths are combined. Alternatively, the increase may not be counteracted in some examples.

In some embodiments of operation 836, each of the rectangles in the collection of rectangles may be compared with every one of the other rectangles in the collection of rectangles to determine whether the rectangle of interest shares an edge with any of the other rectangles. Similarly, in operation 838, each of the rectangles in the collection of rectangles may be compared with every one of the other rectangles in the collection of rectangles to determine whether the rectangle of interest has a similar width and/or height as any of the other rectangles.

As described below in more detail with reference to FIGS. 10A through 10F, in some examples the shared edge referenced in operation 836 and 838 may be a horizontal shared edge, or it may be a vertical shared edge.

Referring again to operation 838, the one or more new rectangles and the one or more additional new rectangles may be added to the collection of rectangles, and the two adjacent triangles from which the one or more new rectangles and the one or more additional new rectangles were created may be removed from the collection of rectangles.

In some embodiments, operations 832, 836, and 838 may be performed iteratively, as described below with reference to FIGS. 10A through 10F.

To illustrate operations 832, 836, 838, FIG. 12A shows two pixel run lengths of interest 1282, 1283 that have been converted into rectangles 1282, 1283. In operation 836, the two rectangles 1282, 1283 may be compared to determine the length of the shared edge 1284 between the two rectangles 1282, 1283—which in FIG. 8A is greater than the combined length of non-shared edges 1285, 1286. Thus, in operation 838, rectangle 1282 may be divided into rectangles 1287 (corresponding to shared edge 1284), 1288 (corresponding to non-shared edge 1286), and rectangle 1283 may be divided into rectangles 1289 (corresponding to non-shared edge 1285), 1290 (corresponding to shared edge 1284). Next, in operation 832, rectangles 1287, 1290 may be combined into new rectangle 1291 because they have a similar width, which corresponds with shared edge 1284 of rectangles 1282, 1283. FIGS. 12B and 12C also illustrate the operation of operations 832, 836, 838 for rectangles of different relative sizes.

Referring again to the method 800 illustrated in FIG. 8, in operation 840, the number of rectangles in the collection may be compared with the number of rectangles in the collection from the previous iteration of operation 830, and if the number of rectangles in the collection has gotten smaller, flow may return to operation 830 again. If the number of rectangles in the collection has ceased getting smaller (e.g., it increased as compared to the previous iteration), then flow continues to operation 850, in which the rectangle mesh is complete. In some examples, the completed rectangle mesh may correspond to the collection of rectangles as it existed immediately preceding the operation 830 in which the number of rectangles increased.

In operation 860 of method 800, the rectangles in the rectangle mesh from operation 850 may optionally be bisected in order to obtain a triangle mesh. The resulting rectangle or triangle mesh may in some embodiments be a pixel-accurate mesh that encompasses all of the pixels of interest and none of the pixels that are not of interest. For example, if both translucent and opaque pixels were included in the pixel run lengths of interest in operation 810, the resulting rectangular or triangular mesh may exactly circumscribe all of the visible pixels in the image and none of the transparent pixels in the image—such as the mesh 1392 that is overlaid on the image 1393 in FIG. 13.

In the event that the image is a texture map corresponding to a sprite, either the rectangle mesh from operation 850 or the triangle mesh from operation 860 may be used to render the sprite on a display. Again assuming that translucent and opaque pixels were included, using the mesh to render the sprite may use a minimum amount of fill rate by rendering only the visible pixels, and rendering none of the transparent pixels. Alternatively, if two different meshes were created— one for the translucent pixels and another for the opaque pixels, the opaque pixels may be rendered using a write only command, while the translucent pixels may be rendered using a read-modify-write command, thereby again using the minimum fill rate possible to render the sprite.

Alternatively, the polygon (e.g., rectangle or triangle) mesh may be used in one or more other manners. For example, the polygon mesh may be used as the basis for generating more complex geometry from the image—such as extruding the mesh to create a solid with an outline that exactly matches the visible parts of the image. As another example, a 3D topographic map may be created using color information (as opposed to the alpha values) of each pixel, where different colored pixels represent different topographic altitudes.

Figure 9:
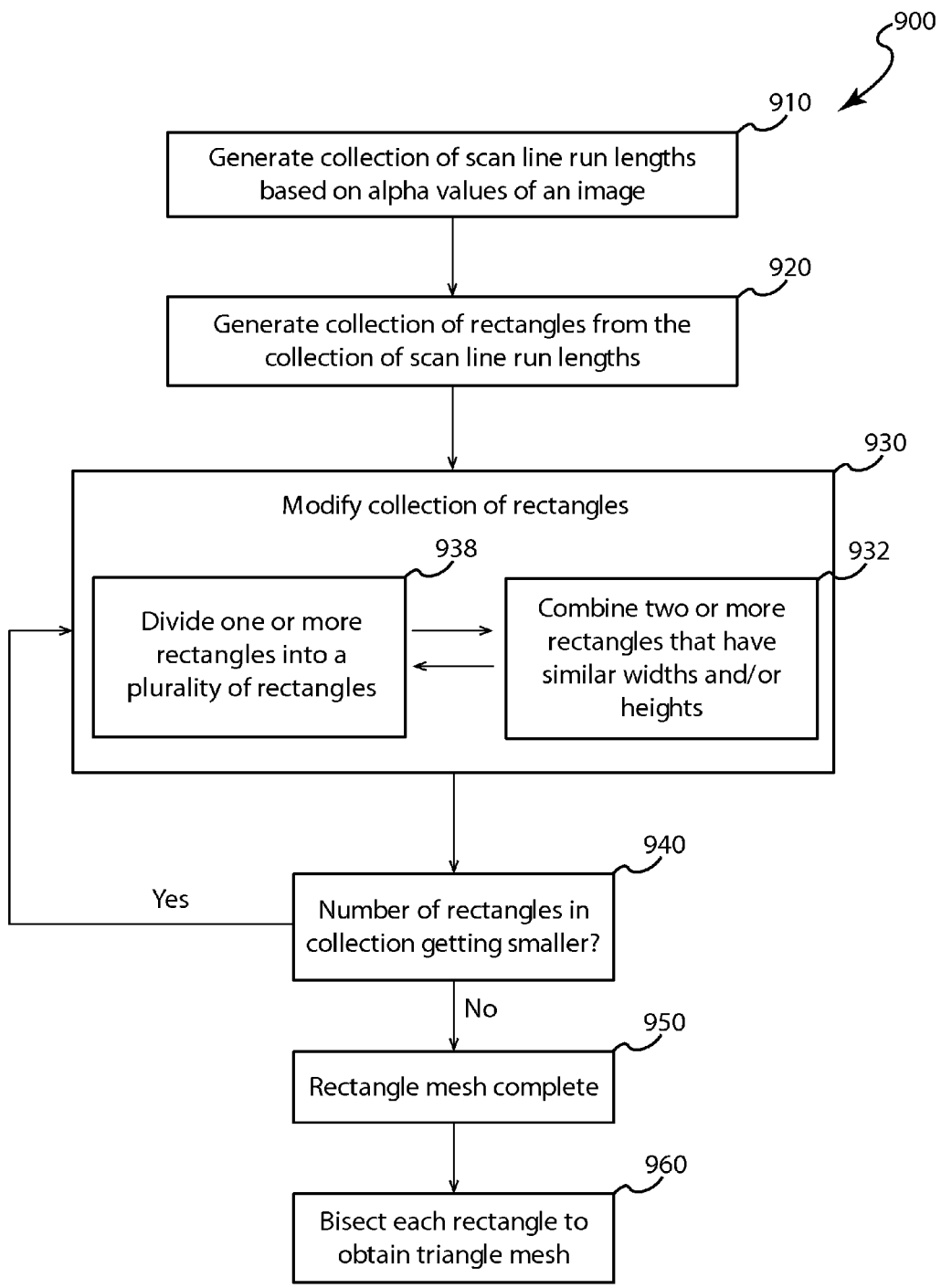
FIG. 9 is a flowchart for one embodiment of a method for generating a polygon mesh.
Figure 10A:
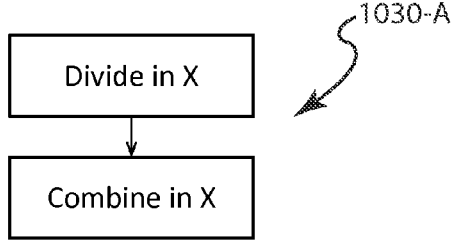
FIGS. 10A through 10F are flowcharts for generating a polygon mesh.
Figure 10B:
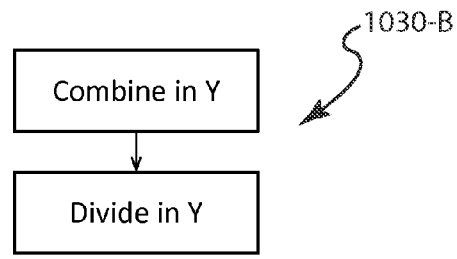
Figure 10C:
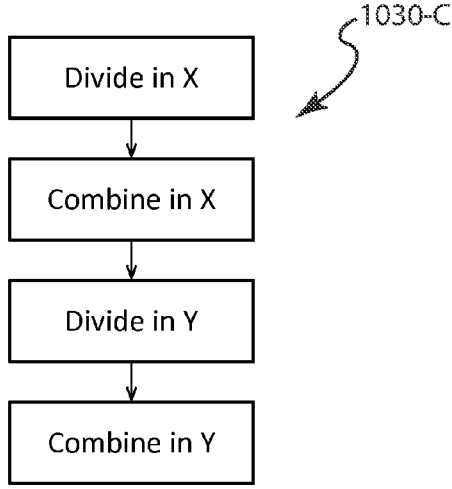
Figure 10D:
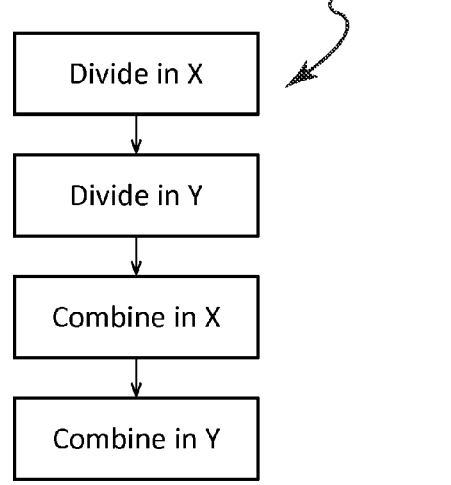
Figure 10E:
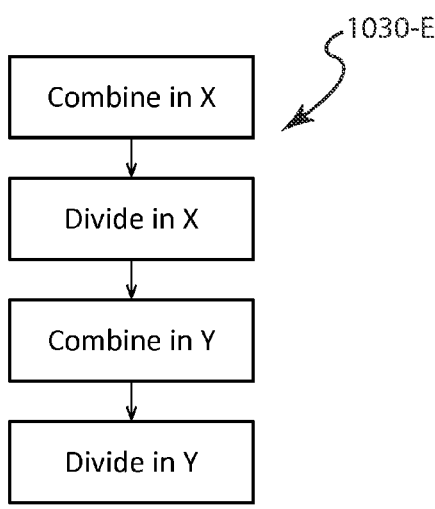
Figure 10F:
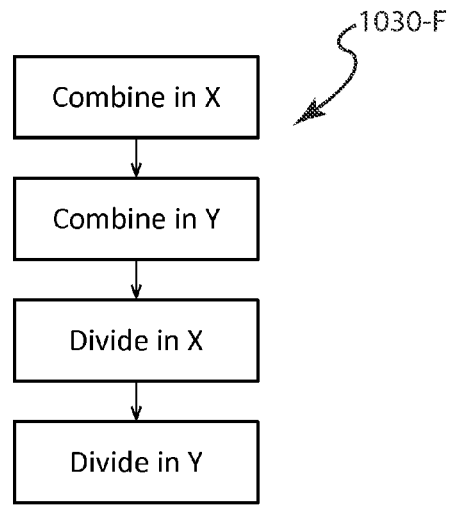

Turning now to FIG. 9, another embodiment of a method 900 is illustrated that may be used to generate a polygon mesh for use in rendering an image (e.g., raster image, texture map, etc.) on a display. Method 900 may be performed by a computer graphics system, such as that shown in FIG. 7, and may be in some respects similar to method 800 shown in FIG. 8 and described above.

Method 900 may begin with operation 910, in which a collection of scan line run lengths is generated based on alpha values of an image. The collection of scan line run lengths may be generated by scanning each row of pixels in the image from left to right, or from right to left. Alternatively, the scan line run lengths may be vertical—in which case they would be generated by scanning each column of pixels in the image from top to bottom or bottom to top. In operation 920, a collection of rectangles may be created by associating each respective scan line run length with a respective rectangle.

FIGS. 11A and 11B illustrate the use of operations 910, 920 on an image.

Specifically, in operation 910, scan line run lengths 1174, 1178, 1181 may be generated based on first and last included pixel positions 1172, 1173, 1176, 1177, 1179, 1180 of respective scan lines of respective images—with the included pixels being determined based on the alpha values of each pixel. In operation 920, each of the scan line run lengths 1174, 1178, 1181 may be converted to a respective rectangle 1174, 1178, 1181.

Returning to method 900 as illustrated in FIG. 9, the collection of rectangles may be modified in operation 930. Specifically, in operation 938, one or more rectangles in the collection of rectangles may be divided into a plurality of rectangles. In operation 932, two or more adjacent rectangles in the collection may be combined if they have similar widths and/or heights.

In some embodiments, one (or more) rectangles may be divided into the plurality of rectangles in operation 938 so that one of the plurality of (new) rectangles can be combined with an adjacent rectangle in operation 932. In other embodiments, two rectangles in the collection of rectangles may each be divided into a respective plurality of rectangles in operation 938, and one of the plurality of rectangles from a first of the two rectangles may be combined with one of the plurality of rectangles from a second of the two rectangles in operation 932.

In some embodiments, operations 932 and 938 may be done iteratively—for example until the collection of rectangles ceases to decrease in number (see operation 940 below).

FIGS. 12A through 12C illustrate the use of operations 932, 938 on an image. In FIG. 12A specifically, rectangles 1282 and 1283 are each divided into rectangles 1287, 1288 and 1289, 1290, respectively, in operation 938. In operation 938, rectangles 1287 and 1290 are combined into rectangle 1291 because they have a similar width.

Returning to FIG. 9, the number of rectangles in the collection may be compared in operation 940 with the number of rectangles in the collection from the previous iteration of operation 930, and, if the number of rectangles in the collection has gotten smaller, flow may return to operation 930 again. If the number of rectangles in the collection has ceased getting smaller (e.g., it increased as compared to the previous iteration), then flow continues to operation 950, in which the rectangle mesh is complete. In some examples, the completed rectangle mesh may correspond to the collection of rectangles as it existed immediately preceding the operation 930 in which the number of rectangles increased.

Figure 13:
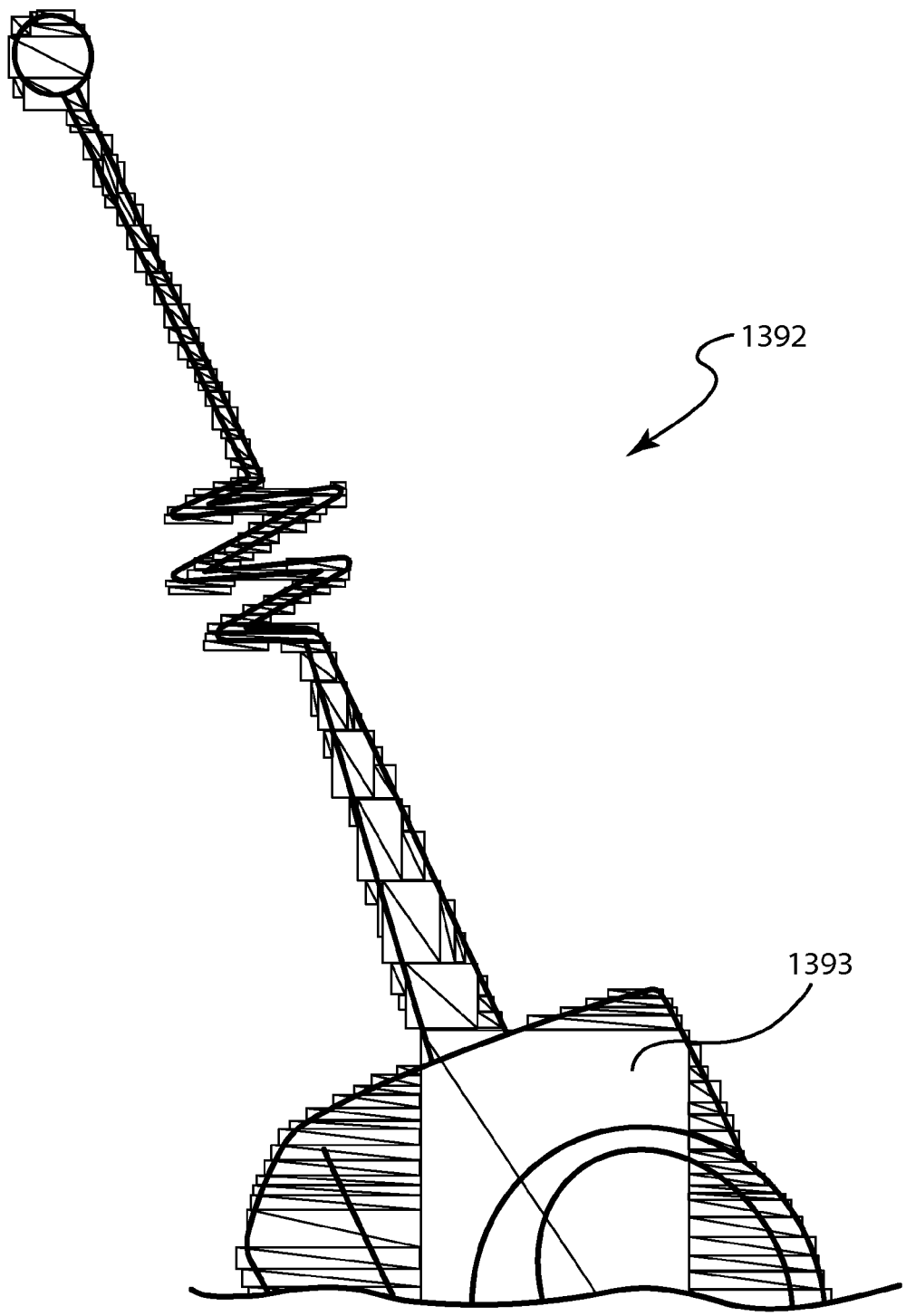
FIG. 13 illustrates one example of a polygon mesh overlaid on an image.

In operation 960, the rectangles in the rectangle mesh from operation 950 may optionally be bisected in order to obtain a triangle mesh. The polygon (e.g., rectangle, triangle) mesh resulting from method 900 may be used in many different manners, including those described above. FIG. 13 illustrates one example of a mesh 1392 overlaid on image 1393 that may be obtained by following the operations in method 900.

With reference now to FIGS. 10A through 10F, the operation 830 in method 800 and the operation 930 in method 900 may take many different forms. As previously mentioned, the respective sub-operations 832, 836, 838 and 932, 938 may be done iteratively, and may be done with respect to horizontal and/or vertical lines of an image. For example, operations 830, 930 may be performed in a horizontal dimension only, in a vertical dimension only, in horizontal and then vertical dimensions, in vertical then horizontal dimensions, and so forth.

Further, the relative order of sub-operations 832, 836, 838, 932, 938 within operations 830, 930 may be varied in different embodiments. In one example, as illustrated by the flowchart 1030-A, operation 830 may begin with the division of rectangles in sub-operations 836/838 performed in the X (horizontal) dimension, followed by the combination of rectangles in sub-operation 832 performed in the X dimension. Similarly, still referring to flowchart 1030-A, operation 930 may begin with the division of rectangles in sub-operation 938 performed in the X dimension, followed by the combination of rectangles in sub-operation 932 performed in the X direction.

Flowcharts 1030-B, 1030-C, 1030-D, 1030-E, and 1030-F also illustrate a few additional combinations of relative orders for sub-operations 832, 836, 838, 932, 938 within operations 830, 930. Of course, many other combinations are possible, including iterative combination of the sub-operations 832, 836, 838, 932, 938, as described above.

Figure 14:
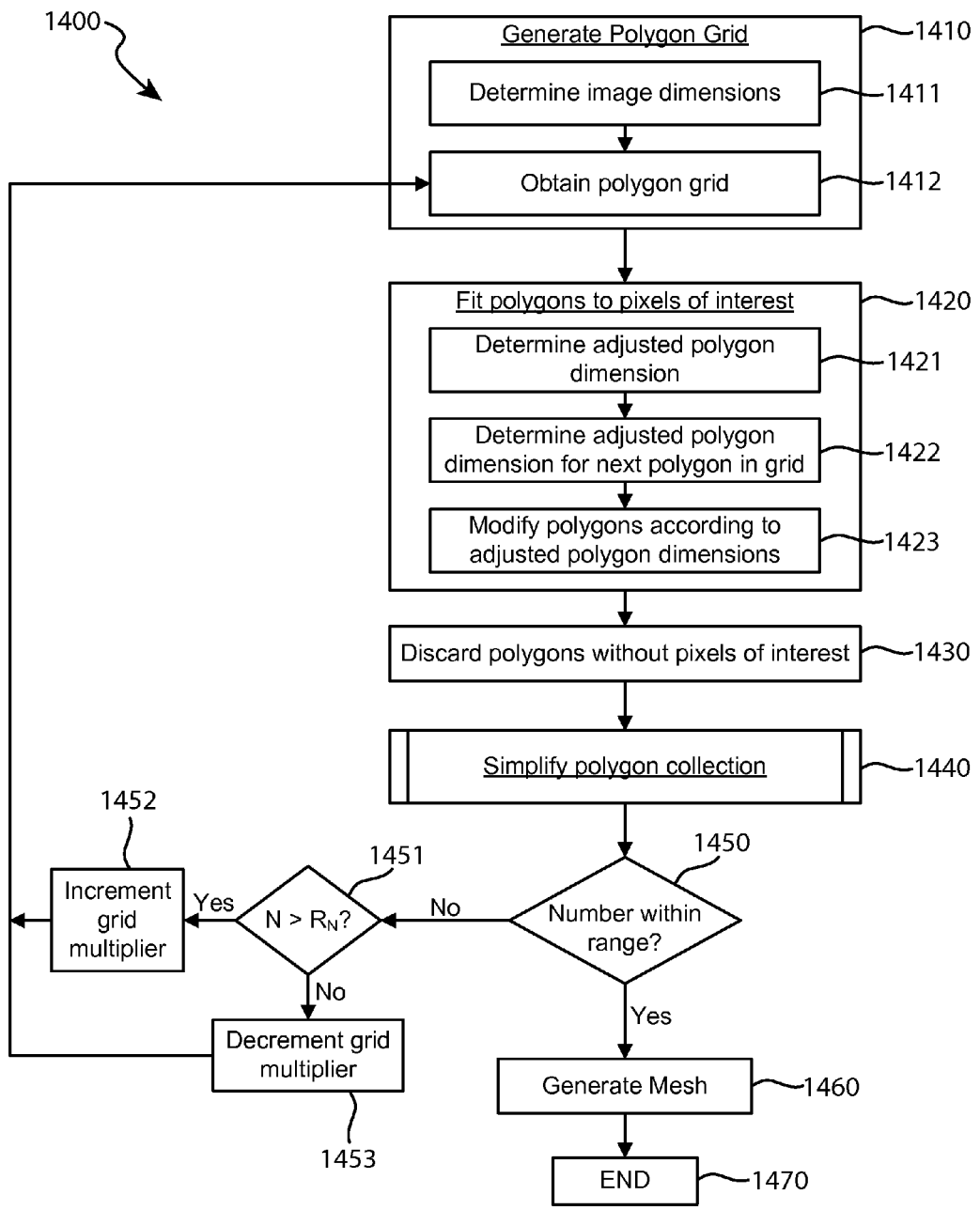
FIG. 14 is a flowchart depicting another embodiment of a method for creating a polygon mesh that may have concavities, convexities, and/or holes.
Figure 15:
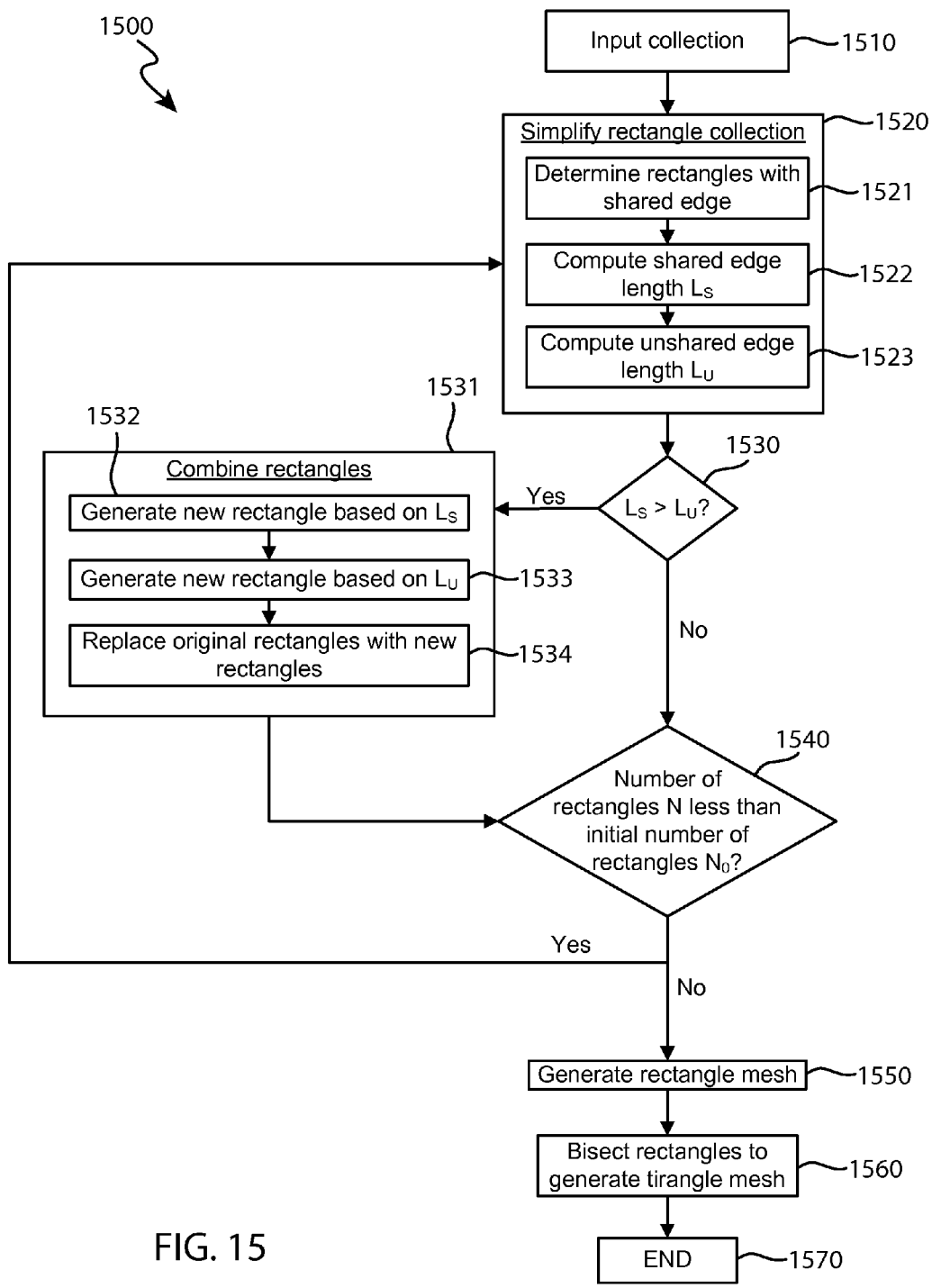
FIG. 15 is another embodiment of a method of simplifying a collection of polygons used for generating a polygon mesh.

With reference to FIGS. 14-17, an alternative method for forming a polygon mesh will now be discussed. FIG. 14 is a flowchart illustrating a method for generating a polygon mesh. FIG. 15 is a flowchart illustrating a method for simplifying the polygon collection, similar to operation 830 in FIG. 8. The computer graphics system 700 of FIG. 7 may be used to perform one or more of the operations of methods 1400 and 1500 in FIGS. 14 and 15.

With reference to FIG. 14 a method 1400 that may be used to create one or more polygon meshes corresponding to an input image will now be discussed. The method 1400 may begin with operation 1410, in which a polygon grid, e.g., a collection or list of polygons, is generated based on the dimensions of an input image. The input image may be, for example, a raster image, texture map, or any other type of image suitable for processing by the graphics system 700. In some embodiments, the input image is a texture map having a plurality of texture pixels, or "texels," the term pixel as used herein is meant to encompass texels. In operation 1410, the image dimensions may be determined. In some embodiments, the image dimensions may be pre-determined or otherwise know or may be dynamically determined by the processing element.

As one example, the image dimensions may be detected when the input image is loaded into the graphics processor 704 (e.g., the image may be received from the central processor 702 to the graphics processor 704 and/or may be received from the graphics memory 706). In this example, the image dimensions may be determined by scanning or otherwise analyzing the image as it is received from the memory or processing element and/or may be included as part of the metadata or other data tied to the image.

Once input image dimensions are determined in operation 1411, the method 1400 may proceed to operation 1412. With continued reference to FIG. 14, in operation 1412, the processing element may create a polygon grid. The polygon grid may be a collection of a plurality of rectangles, squares, triangles, or any other suitable shapes. In one embodiment, the polygon grid is a collection of rectangles in the form of a grid.

In operation 1412, the processing element generates the polygon grid by multiplying the dimensions of the input image by a grid multiplier $M_G$. The grid multiplier $M_G$ functions to divide the input image into number of shapes to form the grid (e.g., defines the characteristics of each shape forming the grid). In other words, the grid multiplier may be a predetermined percentage of the dimensions of the original image so that each shape created by the grid is a percentage of the original input image. The grid multiple may be substantially any value based on the desired display and operating characteristics and in some embodiments, the grid multiplier $M_G$ may have an initial value of 0.01. However, it should be understood that the grid multiplier is not limited to any particular value and substantially any value for the grid multiplier may be used. Upon multiplying image dimensions by the grid multiplier $M_G$, the initial polygon grid formed using the grid multiplier may consist of rectangles of uniform shape and size.

The initial polygon grid may include some rectangles in the collection that have areas outside the dimensions of the input image. In these instances, (i.e., when the remaining area of a portion of the input image does not allow for a fully-sized rectangle), the dimensions of the rectangle may be adjusted so that the rectangle encompasses the remaining area of the input image. In other words, the new dimensions of the rectangle terminate prior to extending over the edge of the input image. In this manner, substantially the whole area of the input image is covered by the initial collection of rectangles in the polygon grid.

Figure 16A:
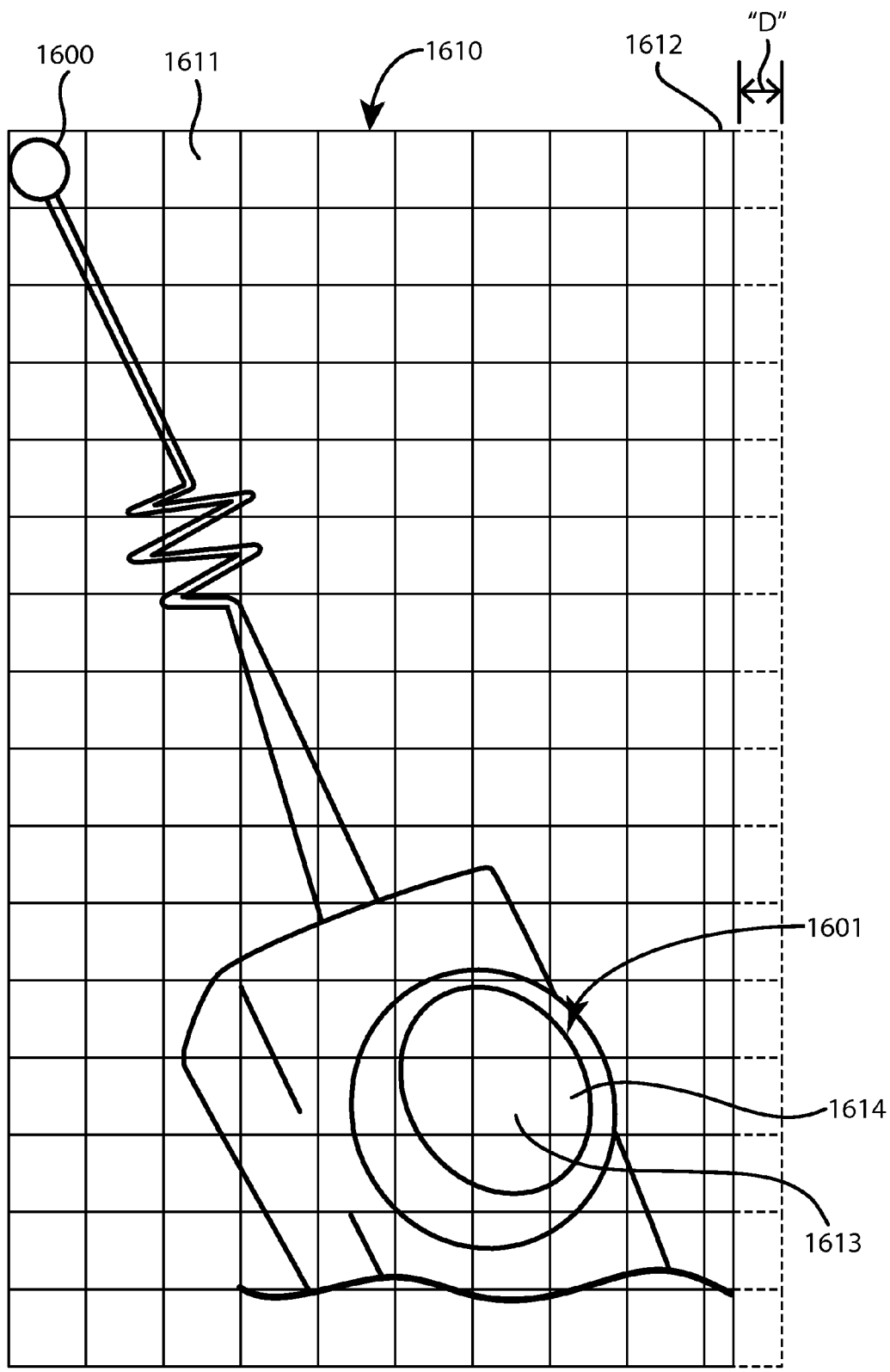
FIGS. 16A-16D illustrate the polygon mesh forming method according to FIG. 14.

An example of the initial polygon grid generated in operation 1410 is shown in FIG. 16A. FIG. 16A shows an input image with an initial grid applied thereto. As shown in FIG. 16A, the input image 1600 may contain at least one empty area 1601 (e.g., superfluous or non-distinct pixels), discussed in more detail below. In operation 1412 of method 1400, multiplying the image dimensions by the grid multiplier $M_G$ generates the initial rectangle grid 1610. The initial rectangle grid 1610 includes a plurality of rectangles 1611 that extend across the input image.

As discussed above with respect to FIG. 14, if a portion of the image 1600 does not allow for a full-sized rectangle (typically at the edges of the image), the row and/or column containing said rectangle(s) is adjusted so that the rectangle extends over an area within the input image dimensions. For example, as shown in FIG. 16A, the column of rectangles containing grid rectangles 1612 has been reduced by an adjustment amount d in order to encompass only pixels corresponding to the original input image area.

Referring back to FIG. 14, upon obtaining the polygon grid in operation 1412, the method 1400 may proceed to operation 1420. In operation 1420, the processing element, which may be the graphics processor 704, central processor 702, and/or substantially any other component capable of executing instructions, adjusts the collection of polygons contained in the polygon grid. In particular, each polygon in the collection may be analyzed to determine whether the analyzed polygon contains any "of interest" pixels, or alternatively any "of interest" texels. As discussed above with respect to FIG. 1, pixels of interest may be determined based on a number of different criteria. As one example, pixels of interest may be pixels or texels having alpha values corresponding to varying levels of visibility (e.g., translucent or opaque). As another example, pixels of interest may be determined using chroma keying, e.g., a specific color or range of colors may be designated as not being of interest in order to isolate a portion of the image from a background corresponding to the designated color or color range. However, other pixel values or relationships between values of nearby pixels may be utilized in the method 1400 and the above examples are meant as illustrative only.

Operation 1420 may include operations 1421, 1422, and 1423 that may be used to fit the polygons to those pixels of interest. In operation 1421 each polygon may be analyzed to determine an adjusted polygon dimension. For example, in one embodiment, the analysis of each grid polygon includes analyzing by the processing element pixels of the polygon until a pixel of interest is found. The polygon boundaries may be determined in both the horizontal and vertical directions to determine the minimum and maximum values for both x and y directions for the polygon. For example, the polygon may be analyzed pixel row by row from a first edge to a second edge (e.g., top to bottom). Once a pixel of interest has been reached, a boundary for the polygon along the y direction is determined. Analyzing the polygon row by row allows the processing element to determine the minimum and maximum y-values of an adjusted polygon. After the y values have been determined, the processing element analyzes each pixel column by column from the left and right determining the boundaries of the polygon based on the location of pixels of interest to define the minimum and maximum x-values of an adjusted polygon.

It should be noted that although the analyzing of the polygons has been discussed as being completed by scanning pixels in rows and columns, other methods of analyzing the pixels within a grid polygon may be used. For example, pixels can be scanned in a random order, from the center toward the edge, or using a predetermined or adaptive algorithm for analyzing pixels or groups of pixels.

After the x and y values of the adjusted polygon have been determined, the method may proceed to operation 1422. In operation 1422, the processing element determines the minimum and maximum x- and y-values for remaining polygons within the polygon collection. In other words, after operation 1421, the method 1400 proceeds to the next adjacent polygon. Operation 1422 may be substantially the same as operation 1421 and may use the same process as described above.

After operations 1421 and 1422 and the minimum and maximum x- and y-values for each polygon in the grid have been determined, the method 1400 may proceed to operation 1423. In operation 1423, the processing element adjusts the dimensions of each polygon. In particular the processing element modifies the dimensions of each polygon to match the detected maximum and minimum x- and y-values in operations 1421, 1422 for that particular polygon.

After all polygons have been analyzed in operation 1420 (i.e., operations 1421-1423 have been completed), the method may proceed to operation 1430. In operation 1430, the processing element discards polygons that do not include pixels of interest. In particular, if no pixels of interest were found within a polygon being analyzed in operation 1420, the polygon is removed from the polygon collection. For example, those pixels that are transparent ("i.e., pure alpha"), or have otherwise been characterized as superfluous or undesirable are discarded. As will be discussed below, by discarding these polygons corresponding to these pixels, the processing element will not render these portions of the image, saving processing resources since these pixels correspond to transparent or otherwise invisible features of the image. Additionally, because the polygons across the entire input image are evaluated, rather than just those on the border of the non-transparent pixels, polygons having only pixels that are superfluous, transparent, or that are otherwise undesirable may be discarded, even if they exist in and/or are surrounded by non-transparent or of interest pixels. Previous methods generated the polygon mesh by shrinking the polygons around the sides of the of interest pixels, but did not evaluate pixels surrounded by non-transparent or of interest pixels. Thus, many polygons remained in the mesh, although those polygons corresponded to undesirable or transparent pixels.

Figure 16B:
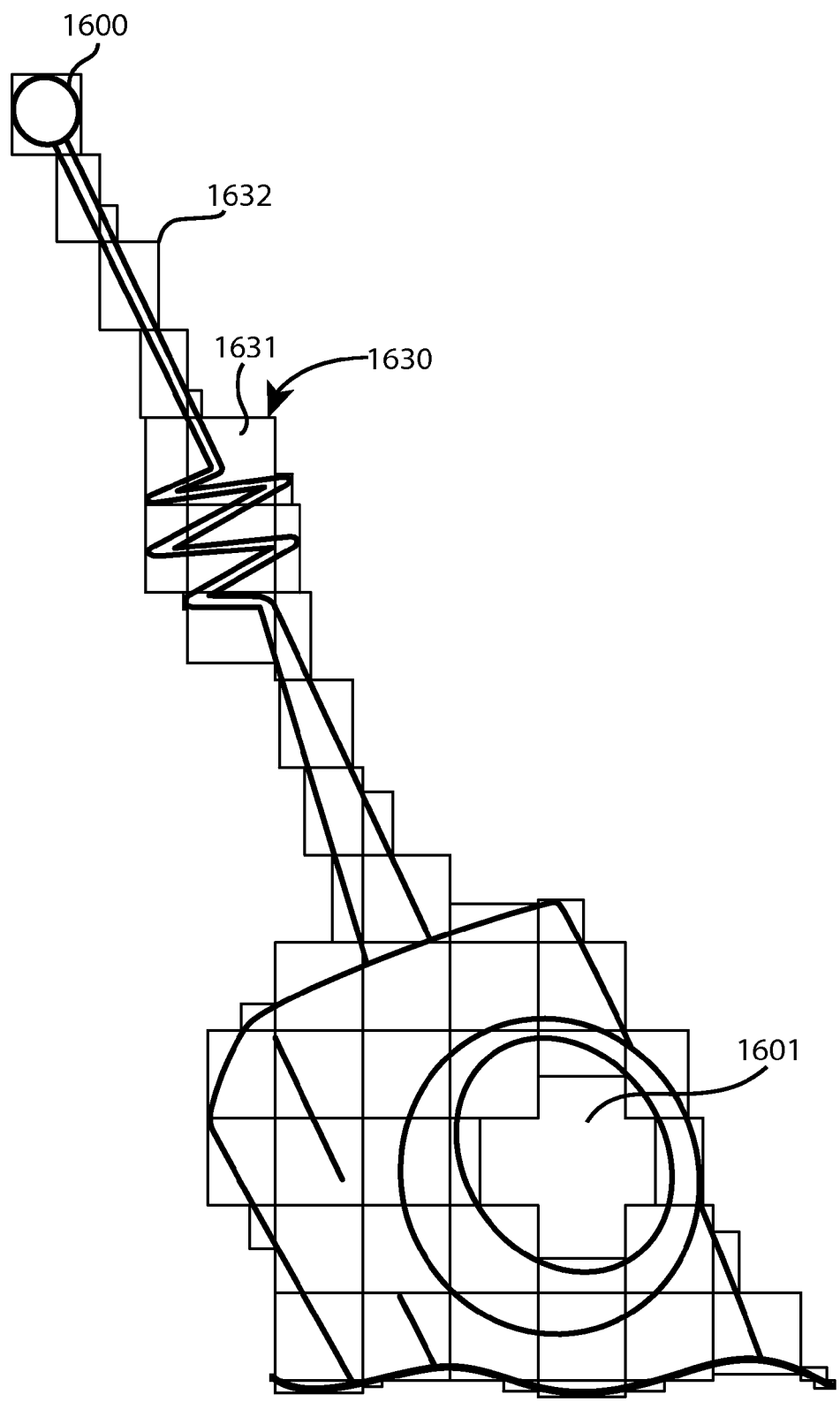

Examples of operations 1420 and 1430 will now be discussed. FIG. 16B depicts the input image 1600 with an adjusted rectangle grid 1632 overlaid thereon. In some embodiments, input image 1600 may be a texture map comprising a plurality of texels. With reference to FIGS. 16A and 16B, the rectangles 1611 and 1612 of FIG. 16A are adjusted and/or removed from the collection of rectangles in the initial rectangle grid 1610 to form the adjusted rectangle grid 1630. During operations 1420 and 1430, it is noted that some polygons were discarded and/or their dimensions adjusted in the vicinity of the empty area 1601 within the input image 1600, thereby generating a hole within the resulting rectangle collection corresponding to this empty area. That is, the polygons located in the hole or empty region of the image, i.e., that did not include any of interest pixels, were discarded even though they were surrounded (in part or completely) by "of interest" pixels, or alternatively by "of interest" texels. In some embodiments the empty area 1601, corresponding to areas of the input image 1600 that do not contain pixels or texels of interest, as discussed in more detail below.

It is also noted that some rectangles, such as rectangle 1631 in FIG. 16B, were not adjusted during operations 1420 and 1430. In other words, only those polygons where the minimum/maximum values varied from the original dimensions have been modified.

As discussed above, the operations 1410 and 1420 generate and adjust a collection of polygons in a polygon grid. The polygons may be any suitable shape, and while discussed above with respect to FIGS. 16A-16B as rectangles, the present disclosure is not limited to this shape. The polygons could instead be triangular, pentagonal, or other multi-sided shape. For purposes of discussion, the polygon collection generated in operation 1420 may be a collection of rectangles as discussed further below and depicted in FIGS. 16 and 17, but it should be understood that any other shape may be used.

With reference again to FIG. 14, after creating the adjusted polygon grid in operation 1430, the method may proceed to operation 1440. In operation 1440, the processing element simplifies the polygon collection. In particular, the collection or list of polygons in the adjusted polygon grid is further simplified. Operation 1440 may include the simplifying method 1500 illustrated in the flowchart of FIG. 15. It should be noted that method 1500 may be substantially similar to one or more of the methods described in U.S. patent application Ser. No. 13/974,882, entitled "Methods and Systems for Generating A Polygon Mesh," filed on Aug. 23, 2013, the entirety of which is hereby incorporated by reference for all purposes.

With reference to FIG. 15, the method 1500 will now be discussed. The method 1500 may begin with operation 1510. In operation 1510, the adjusted polygon collection is input to the processing element (or other component/module configured to simplify the polygon collection).

Once the polygon collection has been input, the method 1500 may proceed to operation 1520. In operation 1520, the polygon collection is simplified. Operation 1520 may be substantially similar to operations 830 and 930 in FIGS. 8 and 9. During operation 1520 the rectangle collection, or alternatively the polygon collection, input at operation 1510 is simplified first by determining which rectangles have shared edges in operation 1521. This may consist of comparing one or more of the rectangles in the collection of rectangles (such as two adjacent rectangles) to compute whether a first length $L_S$ of the shared edge between (two adjacent) rectangles is greater than a second length $L_U$ of the unshared edge between (two adjacent) rectangles. At operation 1530, if the first length is greater than the second length (i.e., $L_S>L_U$), then the method 1500 branches to operation 1531. Alternatively, if $L_S<L_U$, then the method branches to operation 1540. In operation 1531, similar rectangles (e.g., rectangles with dimensions corresponding to the shared length $L_S$) are combined and new rectangles are created corresponding to the unshared length $L_U$. Depending on the first and second lengths $L_S$ and $L_U$, operation 1531 may result in a temporary increase in the number of rectangles in the collection. This increase, however, may be counteracted in a subsequent iteration of operation 1531, in which rectangles with similar heights and/or widths are combined. Alternatively, the increase may not be counteracted in some examples.

In operation 1532, when the shared edge length $L_S$ has been determined to be longer than the unshared edge lengths $L_U$ at operation 1530, operation 1533 proceeds to create a new rectangle which covers the corresponding shared portion of the two rectangles. Further in operation 1533, up to two other rectangles are created corresponding to the unshared portions of the two rectangles, in a similar process to the one shown in FIG. 12 and discussed above. In operation 1534, the original rectangles are discarded from the rectangle collection and the newly formed rectangles based on the shared and unshared lengths $L_S$ and $L_U$, respectively, are added to the collection.

Upon completion of operation 1531, or conversely when the shared length is less than the unshared length ($L_S<L_U$) at operation 1530, the method 1500 proceeds to operation 1540 wherein the total number of rectangles N is compared with the initial number of rectangles $N_0$. If the total number of rectangles N is less than the initial number of rectangles $N_0$, then the method returns to operation 1520 to re-run the simplification operations again. If the total number of rectangles N is equal to or greater than the initial number of rectangles $N_0$, then the method proceeds to operation 1550. Operation 1540, therefore, ensures that the method 1500 results in at least the same number and preferably a fewer number of rectangles in the collection, thereby reducing the burden on the processors of the computer graphics system 700.

In operation 1550, the rectangle mesh, or alternatively the polygon mesh, is generated based on the collection of rectangles created in operations 1520 and 1531. Once the rectangle mesh is formed in operation 1550, the rectangles are bisected to generate a triangle mesh in operation 1560. Upon completion of operation 1560, the method 1500 ends, thus completing operation 1440 of method 1400.

In some embodiments, upon bisecting the collection of rectangles to form corresponding triangle pairs, there may be some triangles which are empty (i.e. they do not contain pixels of interest). Accordingly the triangles forming the triangle mesh as a result of operation 1560 may, upon completion of method 1500, be further processed by operations 1420 and 1430 in order to determine whether they contain any pixels of interest. In particular, the collection of triangles may be scanned in a substantially similar way to operation 1420 to determine if any rows or columns contain pixels of interest. If it is determined that a triangle does not contain pixels of interest, such as having no visible pixels therein, it may be discarded thus further reducing the number of polygons to be processed by the computer graphics system 700, further increasing rendering speed. However, it is noted that this step of further processing the triangles is optional and the method 1500 may be performed without subsequent processing of the triangle mesh collection.

Figure 16C:
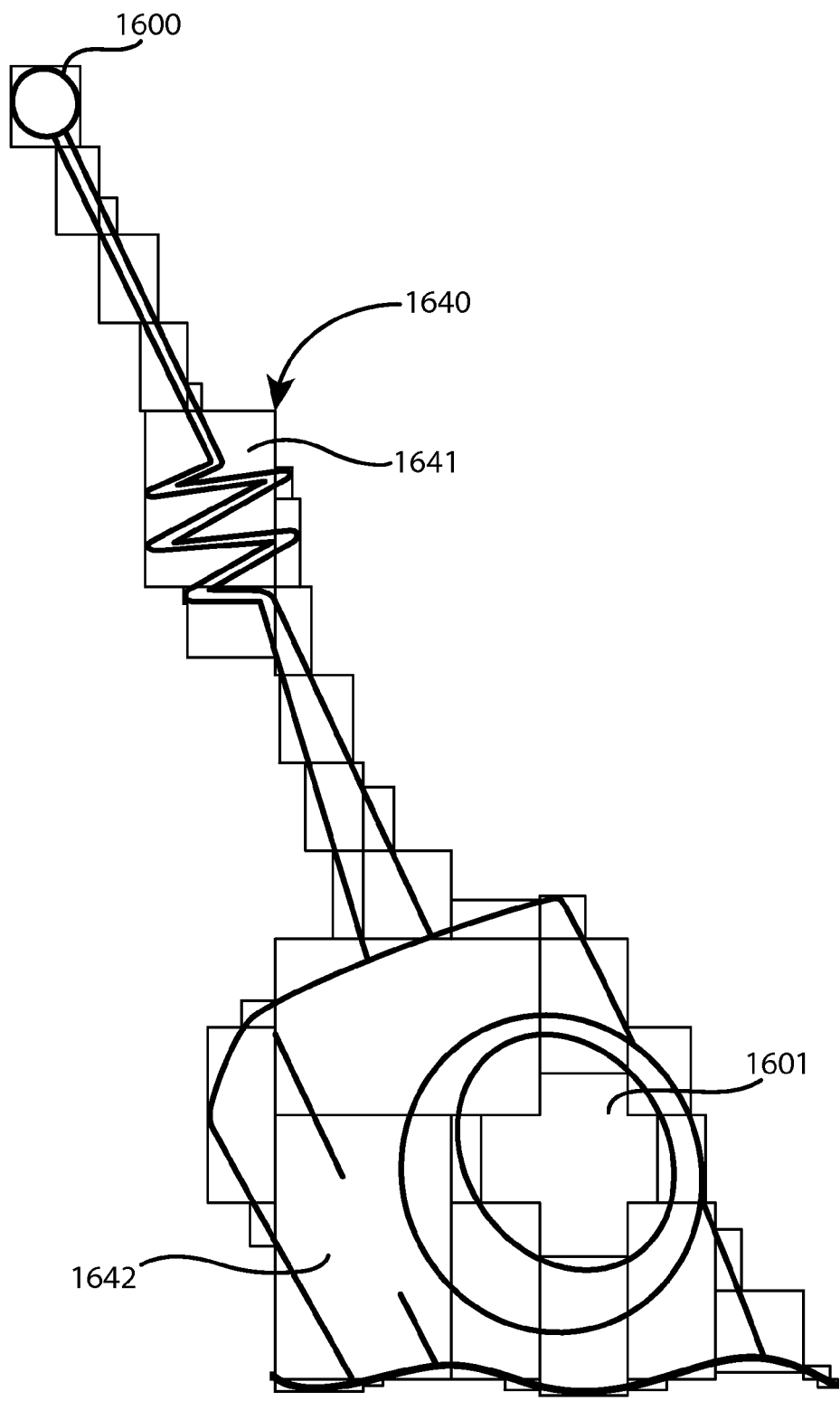

An example of the resulting collection of rectangles generated in operation 1440 is illustrated in FIG. 16C. With reference to FIG. 16C, the input image 1600 includes a simplified rectangle collection 1640 overlaid thereon. Comparing FIG. 16C to 16B, the simplified rectangle collection 1640 contains fewer total rectangles than the adjusted rectangle collection 1630. As a result of operation 1440 and corresponding method 1500, several rectangles have been combined together to create a single, larger rectangle as discussed above. For example, rectangle 1641 in FIG. 16C results from a combination of four rectangles from the adjusted rectangle collection 1630 of FIG. 16B, while rectangle 1642 results from a combination of about six rectangles. It is noted that these numbers are provided merely to illustrate the advantageous results of the simplification method 1500 and are not intended to limit the scope of the present disclosure.

Figure 16D:
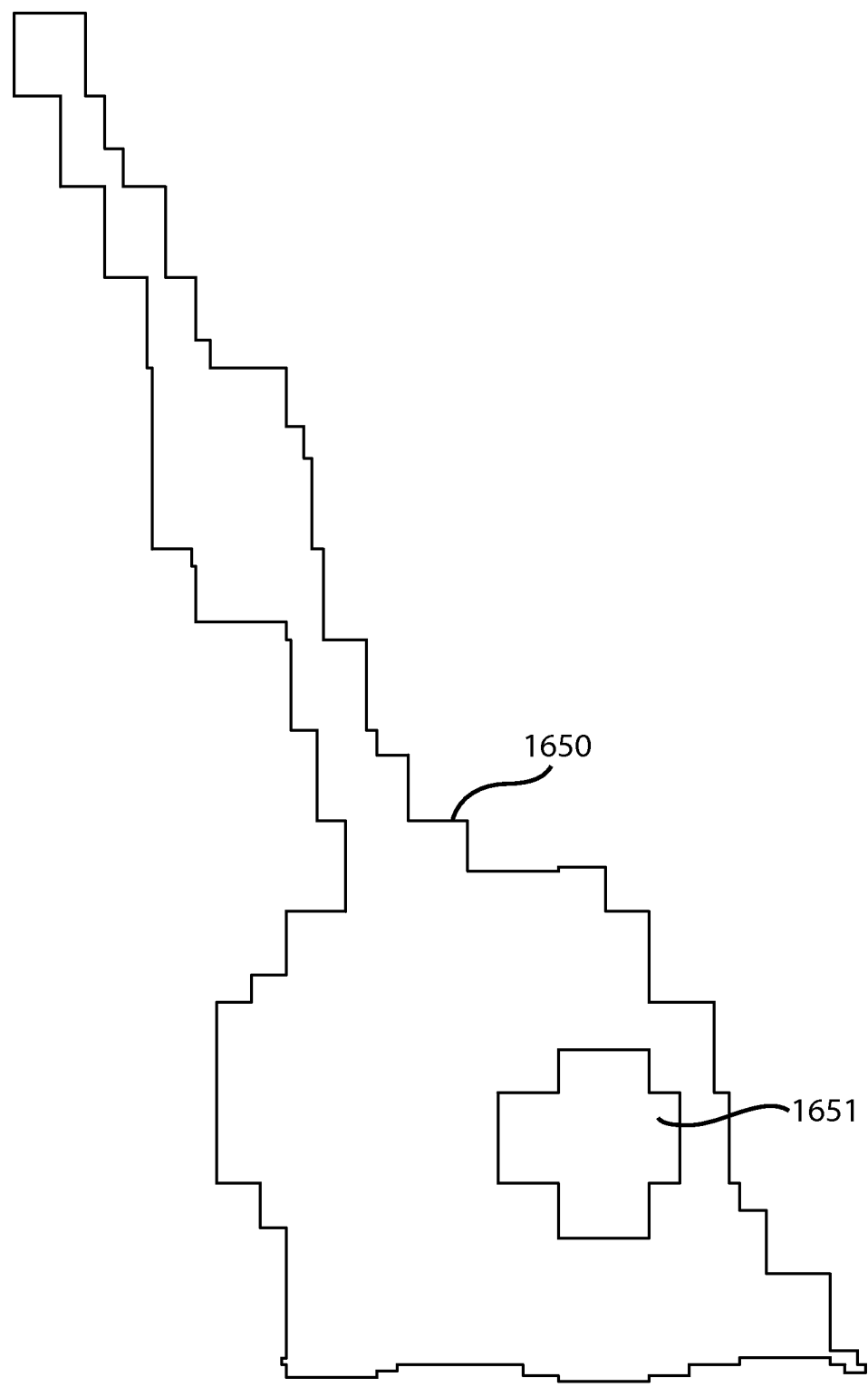

FIG. 16D depicts a hull formed based on the collection of polygons generated in operation 1440 and is provided to illustrate the features of method 1400. In particular, as compared to the hull 193 of FIG. 5 formed by method 100, the hull 1650 more closely approximates the input image as it does not include superfluous or undesirable pixels, such as transparent or pure alpha pixels, even those that were surrounded by of interest pixels.

Furthermore, with reference to FIG. 16D, a hole 1651 may be formed within the hull corresponding to an empty area 1601 of the input image that does not contain pixels of interest, or if the input image is a texture map, texels of interest. In contrast, as the method 100 scans rows and columns from the leftmost, rightmost, uppermost, and lowermost pixels, the method may not detect areas without pixels of interest (e.g., empty areas) within an input image. In other words, the method 100 shrinks the mesh around the boundaries of the input image and thus may not detect superfluous or transparent pixels located within the input image (e.g., holes).

Compared with hull 193 in FIG. 5, the hull 1650 of FIG. 16D created by method 1400 may also be a better approximation of the input image, while accounting for empty areas or "holes" within the input image. It is noted that the hull 1650 may not be specifically used in the creation of the polygon mesh according to method 1400, but is presented here and discussed for purposes of comparing the methods 100 and 1400. In particular, whereas method 100 generates a hull based on scan lines for pixels of interest and then generates a polygon mesh based on the resulting hull, the method 1400 generates the polygon mesh based directly on the pixels of interest, thus method 1400 may omit the step of generating a hull, which further increase the processing speed for the graphics rendering and reduces the resources required. Accordingly, FIG. 16D depicts a hypothetical hull formed by method 1400 and is discussed for purposes of illustrating a potential advantage of method 1400.

As used herein, the term hole, such as the hole 1651, is may correspond to an area 1601 of the input image 1600 containing pixels or texels having a certain opacity, color, or range of colors which are to be excluded from the polygon mesh (i.e., they do not include a visible feature or otherwise have been determined to be discarded). Alternatively, the empty area 1601 (i.e., area without pixels of interest) may correspond to an area with texels having alpha values corresponding to reduced transparency or translucency surrounded by texels with opacity. Furthermore, the empty area 1601 may correspond to an area having changing content (e.g., blinking or variable colors and/or opacity) when rendered by the computer graphics system 700.

Returning to FIG. 14, in operation 1450 the simplified polygon collection created in operation 1440 is analyzed to determine whether the total number of triangles N, or alternatively the total number of polygons N, created in operation 1560 is compared with a pre-determined range $R_N$. The range $R_N$ may be chosen based on a number of criteria. In some embodiments, the range $R_N$ is selected based on the processing power available in the computer graphics system 700. Alternatively, the range $R_N$ may be selected to correspond to a generic computer with unknown hardware capabilities in order to ensure the widest compatibility and functionality. In an exemplary embodiment, the optimal range $R_N$ may be between 135-150 triangles in the triangle mesh. In this example, under certain operating characteristics, a range of 135-150 triangles provides a balance between the optimal number of triangles and the maximum number of pixels of interest covered by the resulting triangle mesh. However, the range $R_N$ can be any suitable range based on the requirements of the computer graphics system and the range discussed above is meant as illustrative only.

Returning to operation 1450, if the number of triangles N is within the range $R_N$, the method proceeds to operation 1460 to generate the triangle mesh or the polygon mesh. If the number of triangles N is not within the range $R_N$, the method proceeds to operation 1451. In operation 1451, the number of triangles N is compared with the range $R_N$ to determine whether the number N is greater than the range $R_N$. If the number of triangles N is greater than the range $R_N$, the operation proceeds to operation 1452, wherein the grid multiplier $M_G$ used in operation 1412 is incremented by a predetermined amount. In other words, the initial grid multiplier is increased.

As discussed above, in an illustrative embodiment the grid multiplier may have an initial value of 0.01. In this example, operation 1452 may cause the grid multiplier $M_G$ to increment by 0.01, resulting in a decrease in the number of polygons generated in operation 1412. However, the increase to the grid multiplier may be substantially any other value.

On the other hand, if the number of triangles is not greater than the range $R_N$, operation 1451 proceeds to operation 1453. In operation 1453, the grid multiplier $M_G$ used in operation 1412 is decremented by a predetermined amount. As discussed above, in an exemplary embodiment the grid multiplier may have an initial value of 0.01. The grid multiplier decrement in operation 1453 may be any value. In some embodiments, operation 1453 may cause the grid multiplier $M_G$ to decrement by 0.001, resulting in an increase in the number of polygons generated in operation 1412.

Upon executing operations 1452 or 1453, the method 1400 returns to operation 1412 to apply the incremented/decremented grid multiplier $M_G$ and proceed with operations 1420 through 1440. Upon completion of operation 1440 using the incremented/decremented grid multiplier, the number N of total polygons is compared with the range $R_N$ in operation 1450. If the number is within the range $R_N$, then the method proceeds to operation 1460 to generate the polygon mesh, and then method 1400 completes at operation 1470.

FIG. 17 is another exemplary illustration of the method 1400 in operation, as set forth above. FIG. 17A depicts an input image 1700 with an overlaid rectangle grid 1710 corresponding to the overall image dimensions. The input image 1700 may have an area 1701 containing, for example, only non-visible pixels. As discussed above, when generating the rectangle grid in operation 1410, if an area of the input image does not allow for a fully-sized grid rectangle, then the row and/or column dimensions are adjusted so that the rectangle grid matches the input image dimensions. For example, in FIG. 17A adjusted rectangles 1712 are formed when the bottom row is adjusted by an amount d. FIG. 17B depicts the adjusted rectangle grid 1730 resulting from operations 1420 and 1430. FIG. 17C illustrates the reduced, simplified rectangle grid 1740 wherein similar rectangles have been combined according to operation 1440 and corresponding method 1500. The collection of rectangles in the simplified rectangle grid 1740 is used to generate the polygon mesh in operation 1460. FIG. 17D depicts a hull 1750 that corresponds to the collection of rectangles 1740. Though not specifically used by the methods 1400 and 1500 to generate the polygon mesh, FIG. 17D is provided to accentuate an advantage of method 1400 being able to generate polygon meshes containing holes, which reduces the number of pixels and polygons processed by the computer graphics system 700, thus speeding up rendering time and reducing power consumption.

As discussed above with respect to FIG. 16D, It is noted that the hull 1750 may not be specifically used in the creation of the polygon mesh according to method 1400, but is presented here and discussed for purposes of comparing the methods 100 and 1400. In particular, whereas method 100 generates a hull based on scan lines for pixels of interest and then generates a polygon mesh based on the resulting hull, the method 1400 generates the polygon mesh based directly on the pixels of interest, thus method 1400 may omit the step of generating a hull. Accordingly, FIG. 17D depicts a hypothetical hull formed by method 1400 and is discussed for purposes of illustrating a potential advantage of method 1400.

The systems and associated methods in accordance with the present disclosure have been described with reference to particular examples thereof in order to illustrate the principles of operation. The above description is thus by way of illustration and not by way of limitation. Various modifications and alterations to the described examples will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure. Accordingly, it is intended that all such alterations, variations, and modifications of the disclosed examples are within the scope of this disclosure. For example, while FIGS. 1, 1A and 2 illustrate embodiments of methods 100, 100A, 200 for creating a hull that may have concavities, the variations and comments described with reference to one method 100 be applied to the operations in the other methods as appropriate, and vice versa.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed examples. Steps or acts described in sequential order may be implemented before, after, sequentially or non-sequentially as may fit the particular description.

All relative and directional references (including vertical, horizontal, up, down, left, right, top, bottom, and so forth) are given by way of example to aid the reader's understanding of the particular examples described herein—although it will be understood that implementations of the present disclosure may include variations on the specific relative and directional references used based on the frame of reference of specific implementations.

What is claimed is:

1. A method for graphics rendering, comprising:
   creating by a processing element a collection of polygons based on one or more dimensions of an input image;
   determining by the processing element an adjustment amount for each polygon within the collection of polygons by consecutively analyzing the polygons for pixels of interest;
   modifying by the processing element each polygon based on the respective adjustment amounts for polygons in the collection;
   comparing by the processing element a pair of polygons of the collection of polygons to determine a shared portion of an edge of the pair of polygons and an unshared portion of the edge of the pair of polygons;
   generating by the processing element a first new polygon by combining the pair of polygons along the shared portion of the edge;
   generating by the processing element a second new polygon based on the unshared portion of the edge;
   generating by the processing element a polygon mesh based at least in part on the generated polygons; and
   rendering an image for display based, at least in part, on the polygon mesh.

2. The method of claim 1, wherein creating the collection of polygons further comprises multiplying the one or more dimensions of the input image by a grid multiplier.

3. The method of claim 2, further comprising:
   incrementing or decrementing the grid multiplier based on a total number of polygons in the polygon mesh; and
   creating a new collection of polygons based on the incremented or decremented grid multiplier.

4. The method of claim 1, wherein modifying each polygon further comprises discarding polygons without any pixels of interest from the collection.

5. The method of claim 1 further comprising:
   dividing one or more polygons in the collection into a plurality of polygons; and
   combining two or more adjacent polygons in the collection that have similar widths and/or heights.

6. The method of claim 1, wherein creating the polygon mesh further comprises the processing element bisecting the polygons in the collection to generate a triangle mesh.

7. The method of claim 1, wherein the generated polygon mesh substantially corresponds to the input image.

8. The method of claim 1, wherein the collection of polygons is a grid formed by said polygons.

9. The method of claim 1, wherein when a collection of polygons does not fully cover the one or more dimensions of the input image, the method further comprises by creating at least one row and/or column with a reduced polygon dimension corresponding the portion of the image not covered by the collection.

10. The method of claim 1, wherein the input image is a texture map.

11. The method of claim 1, further comprising rendering a sprite on a display using the polygon mesh.

12. The method of claim 1, wherein the generated mesh may include one or more holes and/or concavities.

13. A method for graphics rendering, comprising:
   creating by a processing element a collection of polygons based on one or more dimensions of an input image;

determining by the processing element an adjustment amount for each polygon within the collection of polygons by consecutively analyzing the polygons for pixels of interest;

modifying by the processing element each polygon based on the respective adjustment amounts for polygons in the collection;

comparing by the processing element a plurality of polygons of the collection of polygons to determine a shared edge and an unshared edge of the plurality of polygons;

generating by the processing element a first new polygon by combining the plurality of polygons along the shared edge;

generating by the processing element a second new polygon based on the unshared edge;

generating by the processing element a polygon mesh based at least in part on the generated polygons; and rendering an image for display based, at least in part, on the polygon mesh, wherein generating the first and second new polygons comprises reducing the total number of polygons in the collection.

14. The method of claim 13, wherein a target total number of polygons is chosen based on known hardware characteristics.

15. The method of claim 13, wherein reducing the total number of polygons comprises reducing the total number of polygons to within a predetermined range.

16. A method for rendering images, comprising:

obtaining by a processing element one or more dimensions of an input image;

generating by the processing element a collection of polygons based on the input image dimensions;

determining pixels of interest within each polygon;

modifying at least one polygon of the collection of polygons based on the pixels of interest;

determining a shared portion of an edge of a pair of polygons of the collection of polygons and an unshared portion of the edge of the pair of polygons of the collection of polygons;

generating a first new polygon by combining the pair of polygons along the shared portion of the edge;

generating a second new polygon based on the unshared portion of the edge;

creating a polygon mesh based at least in part on the generated polygons; and rendering the input image for display based, at least in part, on the polygon mesh.

17. The method of claim 16, further comprising dividing one or more polygons in the collection into a plurality of polygons; and combining two or more adjacent polygons in the collection that have similar widths and/or heights.

18. The method of claim 16, further comprising reducing the total number of polygons in the collection.

19. The method of claim 16, wherein the generated mesh may include one or more holes and/or concavities.

20. A computing device for rendering images, comprising:

a processing unit configured to generate a polygon grid corresponding to an image;

detect the position of pixels of interest within each polygon;

modify the polygon grid based on the detected pixels of interest;

simplify the polygon grid to generate a polygon mesh by combining a plurality of polygons in the polygon grid along shared portions of edges of the plurality of polygons and generating new polygons along unshared portions of edges of the plurality of polygons to reduce a number of polygons in the polygon mesh; and a display coupled to the processing unit and configured to render the image using the polygon mesh generated by the processing unit.

* * * * *